(12) United States Patent
Sano et al.

(10) Patent No.: US 8,402,052 B2
(45) Date of Patent: Mar. 19, 2013

(54) SEARCH DEVICE, SEARCH METHOD, AND COMPUTER-READABLE RECORDING MEDIUM STORING SEARCH PROGRAM

(75) Inventors: Takeshi Sano, Kawasaki (JP); Kazuo Sasaki, Kawasaki (JP); Takeshi Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 12/723,232

(22) Filed: Mar. 12, 2010

(65) Prior Publication Data

US 2010/0235390 A1 Sep. 16, 2010

(30) Foreign Application Priority Data

Mar. 16, 2009 (JP) ................................ 2009-063104

(51) Int. Cl.
 *G06F 17/30* (2006.01)
(52) U.S. Cl. .......................... 707/770; 706/10
(58) Field of Classification Search .................. 707/770; 706/10
See application file for complete search history.

(56) References Cited

U.S. PATENT DOCUMENTS

| | | | | |
|---|---|---|---|---|
| 6,101,491 | A * | 8/2000 | Woods | 707/696 |
| 6,510,428 | B2 * | 1/2003 | Tsuchida et al. | 707/6 |
| 6,704,748 | B1 * | 3/2004 | Suganuma | 707/706 |
| 2004/0002945 | A1 * | 1/2004 | Shibata | 707/1 |
| 2004/0122802 | A1 | 6/2004 | Allen et al. | |
| 2004/0186829 | A1 | 9/2004 | Suzuki et al. | |
| 2006/0069883 | A1 * | 3/2006 | Shimizu | 711/154 |
| 2006/0212429 | A1 | 9/2006 | Bruno et al. | |
| 2007/0220020 | A1 * | 9/2007 | Goto | 707/100 |
| 2008/0222122 | A1 | 9/2008 | Morita | |

FOREIGN PATENT DOCUMENTS

| | | |
|---|---|---|
| JP | 09-034759 | 2/1997 |
| JP | 2004-280528 | 10/2004 |
| JP | 2007-213601 | 8/2007 |
| JP | 2008-217600 | 9/2008 |

OTHER PUBLICATIONS

Extended European Search Report issued Nov. 26, 2012 in corresponding European Patent Application No. 10154565.5.
Matthias Jarke et al., "Query Optimization in Database Systems", Computing Surveys, vol. 16, No. 2, Jun. 1984, pp. 111-152.

* cited by examiner

*Primary Examiner* — James Trujillo
*Assistant Examiner* — Dawaune Conyers
(74) *Attorney, Agent, or Firm* — Staas & Halsey LLP

(57) ABSTRACT

The search method includes: receiving a search request including plural search conditions; separating the plural search conditions into search conditions for individual databases; storing, for each database, the search condition and the database identifier in a condition record; searching a search result management table by the database identifier and the search condition; determining anterior search databases; searching each of the anterior search databases by the search condition to acquire a first search result; determining common entity identifiers included in common in the first search results; and searching each of posterior search databases by the common entity identifiers and the search condition.

10 Claims, 30 Drawing Sheets

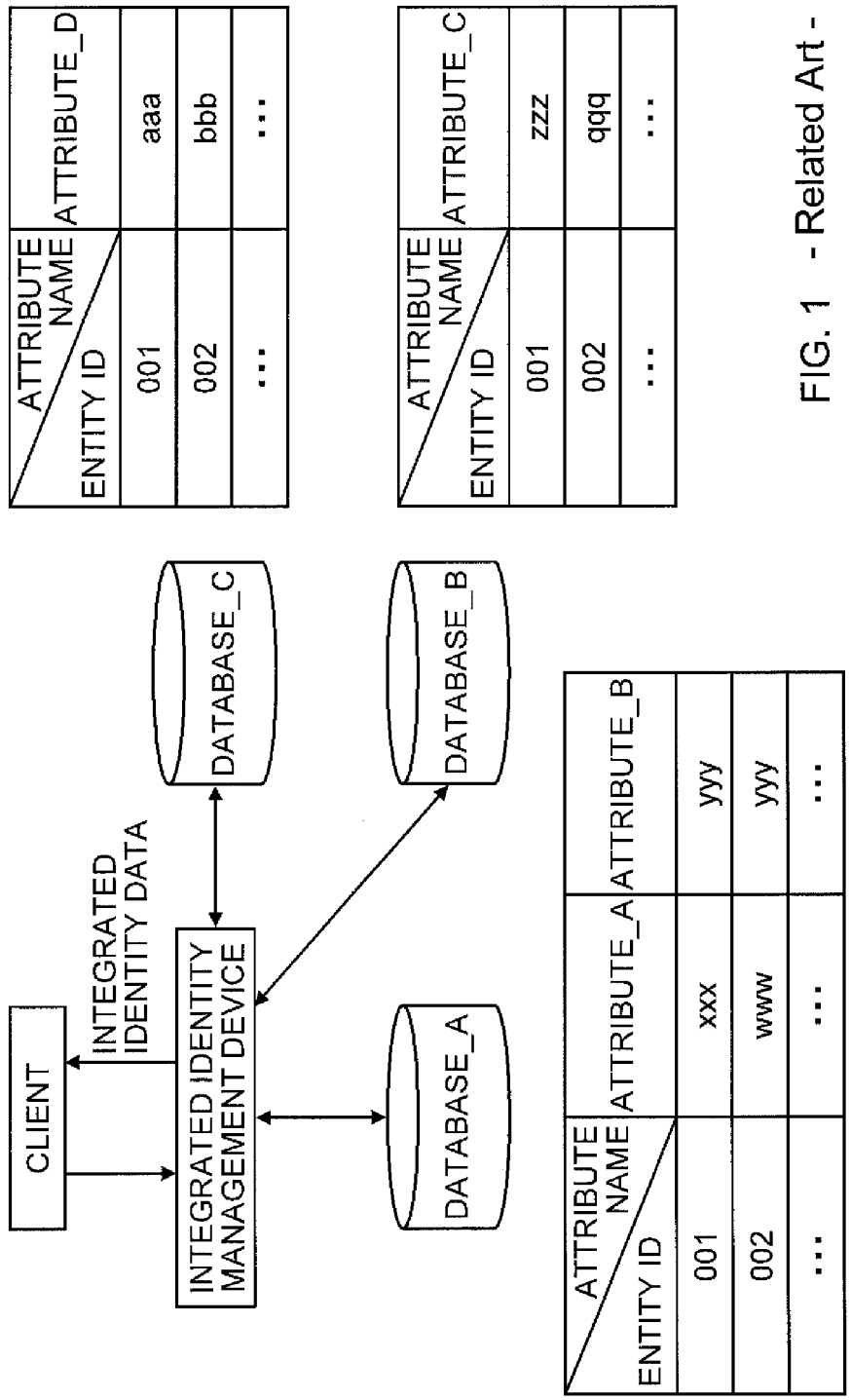
FIG. 1 - Related Art -

| ATTRIBUTE NAME / ENTITY ID | ATTRIBUTE_A | ATTRIBUTE_B | ATTRIBUTE_C | ATTRIBUTE_D |
|---|---|---|---|---|
| 001 | xxx | yyy | zzz | aaa |
| 002 | www | yyy | qqq | bbb |
| ... | ... | ... | ... | ... |

| DATABASE ID ⟵502 | ATTRIBUTE NAME ⟵504 |
|---|---|
| DATABASE_A | ATTRIBUTE_A, ATTRIBUTE_B |
| DATABASE_B | ATTRIBUTE_C, ATTRIBUTE_D |
| DATABASE_C | ... |
| ... | ... |

FIG. 6

| SEARCH DATABASE ID ⟵602 | SEARCH CONDITION ⟵604 | HIT COUNT ⟵606 | SEARCH COUNT ⟵608 |
|---|---|---|---|
| DATABASE_A | ATTRIBUTE_A=xxx | 400 | 100 |
| DATABASE_A | ATTRIBUTE_B=yyy | 1000 | 50 |
| DATABASE_A | ATTRIBUTE_A=xxx AND ATTRIBUTE_B=yyy | 150 | 10 |
| DATABASE_B | ATTRIBUTE_C=zzz | 8 | 1000 |
| DATABASE_B | ATTRIBUTE_D=www | 10 | 20 |
| ... | ... | ... | ... |

| SEARCH CONDITION (702) | SEARCH DATABASE ID (704) | HIT COUNT (706) |
|---|---|---|
| ATTRIBUTE_B=yyy | DATABASE_A | 1000 |
| ATTRIBUTE_C=zzz | DATABASE_B | 8 |
| ... | ... | ... |

FIG. 7A

| SEARCH CONDITION (712) | SEARCH DATABASE ID (714) |
|---|---|
| ATTRIBUTE_C=zzz | DATABASE_B |
| ... | ... |
| ... | ... |

FIG. 7B

| SEARCH DATABASE ID ~2002 | SEARCH CONDITION ~2004 | HIT COUNT ~2006 | SEARCH COUNT ~2008 | HIT ID ~2010 |
|---|---|---|---|---|
| DATABASE_A | ATTRIBUTE_A=xxx | 400 | 100 | — |
| DATABASE_A | ATTRIBUTE_B=yyy | 1000 | 50 | — |
| DATABASE_B | ATTRIBUTE_C=zzz | 8 | 1000 | — |
| DATABASE_B | ATTRIBUTE_D=www | 10 | 20 | — |
| DATABASE_D (PRESENCE SERVER) | ATTRIBUTE_E=aaa | 3 | 200 | 001, 002, 004 |
| ... | ... | ... | ... | ... |

FIG. 20

SEARCH DEVICE, SEARCH METHOD, AND COMPUTER-READABLE RECORDING MEDIUM STORING SEARCH PROGRAM

CROSS-REFERENCE TO RELATED APPLICATION

This application is based upon and claims the benefit of priority of the prior Japanese Patent Application No. 2009-063104, filed on Mar. 16, 2009, the entire contents of which are incorporated herein by reference.

FIELD

The embodiments discussed here are related to a technique for efficiently cross-searching plural databases sharing management of data.

BACKGROUND

When management of plural attributes of a person or an object, which is associated with an entity identifier (ID), is shared among plural databases for example, client computers (also referred to as clients) may obtain, in an integrated manner, attribute values of the attributes managed in the respective databases through an integrated identity management technique. FIG. 1 is a diagram illustrating an example of an integrated identity management system. FIG. 2 is a diagram illustrating an example of integrated identity data. In the example illustrated in FIG. 1, an attribute_A and an attribute_B are managed in a database_A, an attribute_C is managed in a database_B, and an attribute_D is managed in a database_C. The integrated identity management system includes an integrated identity management device. The integrated identity management device holds information regarding which attribute is managed in which database, and integrates attribute values of the attribute_A to attribute_D managed in the respective databases to provide clients with integrated identity data as illustrated in FIG. 2, for example.

In such an integrated identity management system, when the integrated identity management device has received an "AND" search request including plural search conditions each of which contains a combination of an attribute name and an attribute value, the integrated identity management device cross-searches the plural databases so as to extract data that satisfies all the search conditions. Cross search methods include, for example, a method of searching plural databases in parallel and a method of sequentially searching plural databases one by one.

Japanese Laid-open Patent Publication No. 2008-217600, No. 9-34759, No. 2004-280528, and No. 2007-213601 disclose related techniques.

However, known cross search methods have the following problems. Executing a method of searching plural databases in parallel may increase network load and processing time when a hit count, which represents an amount of entity IDs found in a search, in individual search results is large, because it may take time to merge the individual search results, and because useless data that does not remain in a final search result may be extracted from the individual databases. Executing a method of sequentially searching plural databases one by one may take more time than executing parallel search when the number of databases is large.

SUMMARY

According to an aspect of the present invention, provided is a computer-readable recording medium storing a program including computer-executable instructions enabling a computer to execute a search method for searching plural databases sharing management of plural attributes associated with an entity identifier capable of identifying an entity. Each of the plural databases stores an entity identifier in association with an attribute value of one of the plural attributes and an attribute name.

The search method includes:

receiving a search request including plural search conditions, wherein each of the plural search conditions contains a combination of an attribute name and an attribute value;

separating the plural search conditions included in the search request into search conditions for individual databases in accordance with an attribute management table, wherein the attribute management table has attribute records containing a database identifier capable of identifying one of the plural databases and an attribute name of an attribute managed in the one of the plural databases;

storing, for each database, the search condition and the database identifier in a condition record stored in a condition storage;

searching a search result management table by the database identifier and the search condition contained in each of the condition records, wherein the search result management table has result records containing a database identifier of a search database, a first search condition, and a hit count representing an amount of entity identifiers found in a past search, wherein the attribute value managed in association with the entity identifiers in the search database satisfies the first search condition;

determining anterior search databases identified with the database identifiers contained in the result records, wherein the result records contains a hit count which is less than or equals to a predetermined amount or a hit count within a predetermined lowest ranks;

searching each of the anterior search databases by the search condition contained in the condition record containing the database identifier of the each of the anterior search databases to acquire a first search result including a first entity identifier, wherein the attribute value managed in association with the first entity identifier in the each of the anterior search databases satisfies the search condition for the each of the anterior search databases;

determining common entity identifiers included in common in the first search results; and searching each of posterior search databases by the common entity identifiers and the search condition contained in the condition record to acquire a second search result including second entity identifiers out of the common entity identifiers, wherein the posterior search database is out of the plural databases other than the anterior search databases, wherein the attribute value managed in association with the second entity identifier in the each of the posterior search databases satisfies the search condition for the each of the posterior search database.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of an integrated identity management system;

FIG. 2 is a diagram illustrating an example of integrated identity data;

FIG. 5 is a diagram illustrating an example of data configuration of an attribute management table stored in an attribute management table storage according to an embodiment of the present invention;

FIG. 6 is a diagram illustrating an example of data configuration of a search result management table stored in a search result management table storage according to an embodiment of the present invention;

FIG. 7A is a diagram illustrating an example of data configuration of an anterior search candidate array stored in an array data storage according to an embodiment of the present invention;

FIG. 7B is a diagram illustrating an example of data configuration of an anterior search DB array stored in an array data storage according to an embodiment of the present invention;

FIG. 20 is a diagram illustrating an example of data configuration of a search result management table stored in a search result management table storage according to an embodiment of the present invention;

DESCRIPTION OF EMBODIMENTS

The embodiments discussed hereafter provide a technique enabling an efficient cross search across plural databases.

First Embodiment

Figure 3:
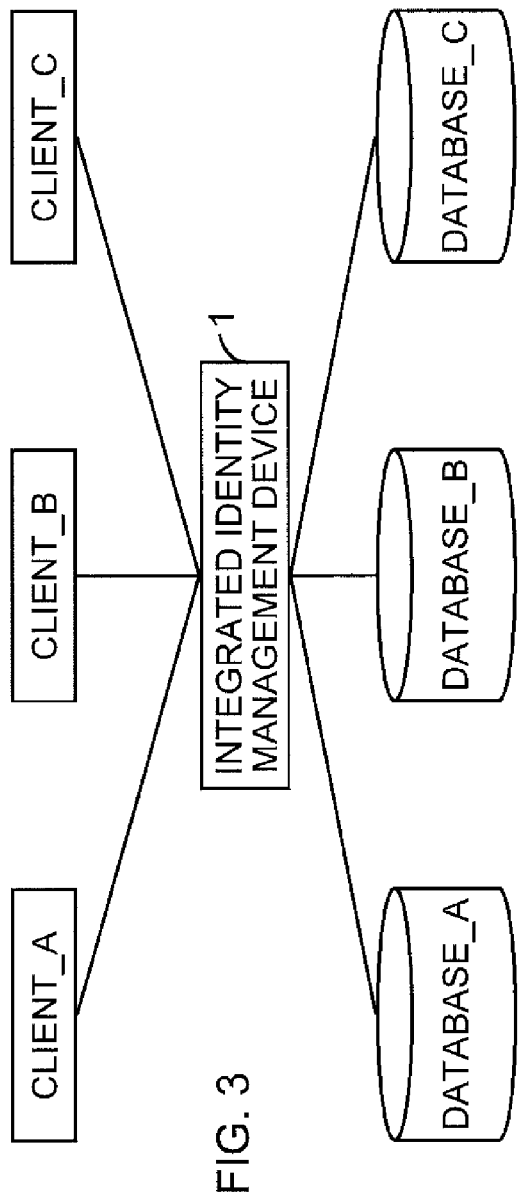
FIG. 3 is a diagram illustrating a configuration of an example an integrated identity management system according to an embodiment of the present invention.

A first embodiment of the present invention will be discussed with reference to FIG. 3 to FIG. 17. FIG. 3 is a diagram illustrating a configuration of an example an integrated identity management system according to an embodiment of the present invention. As illustrated in FIG. 3, an integrated identity management device 1 is connected to plural databases (database_A to database_C in FIG. 3) and plural clients (client_A to client_C in FIG. 3) that use integrated identity data such as illustrated in FIG. 2.

Figure 4:
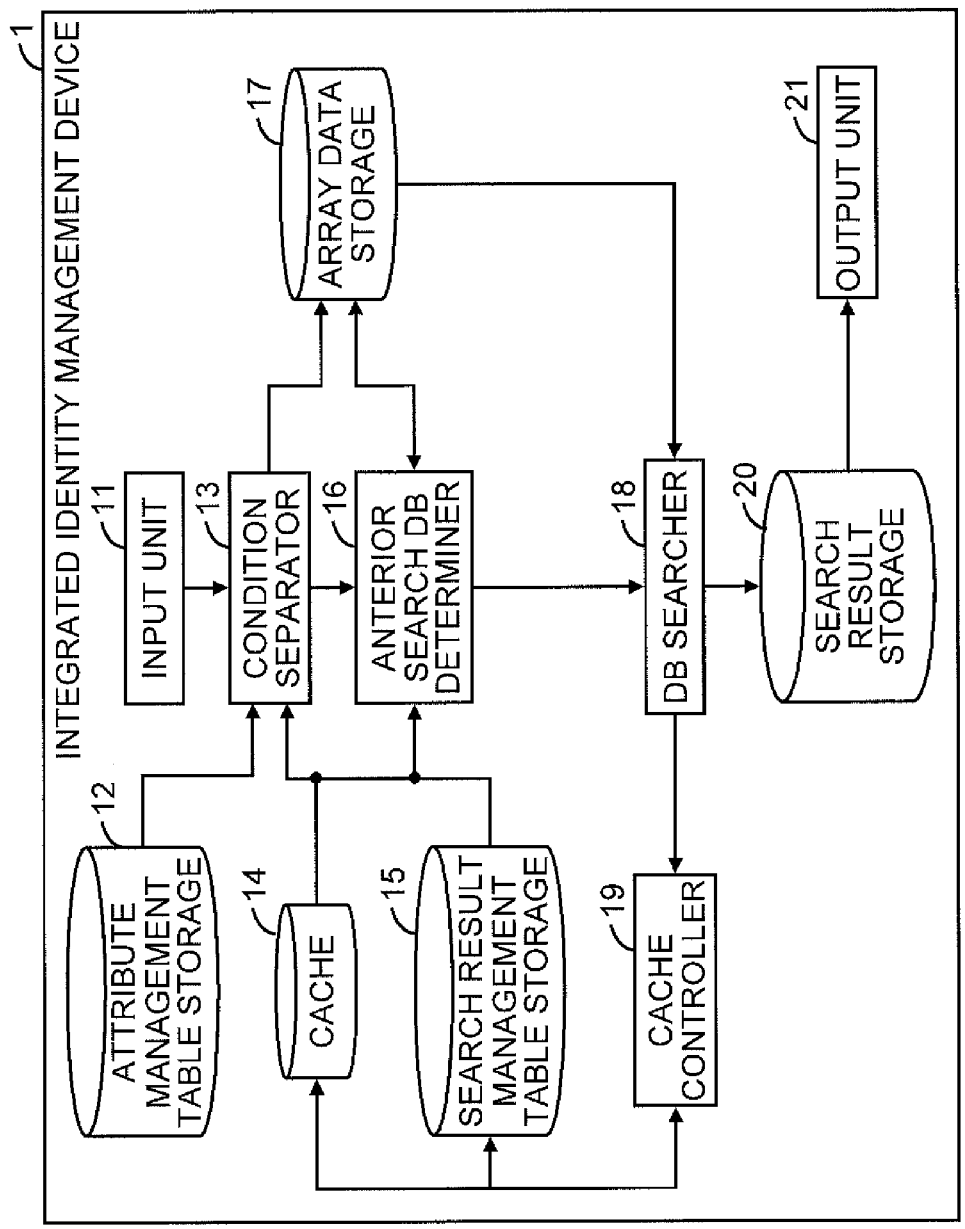
FIG. 4 is a block diagram illustrating an example of a system configuration of an integrated identity management device according to an embodiment of the present invention.

FIG. 4 is a block diagram illustrating an example of a system configuration of an integrated identity management device according to an embodiment of the present invention. The integrated identity management device 1 includes an input unit 11, an attribute management table storage 12, a condition separator 13, a cache 14, a search result management table storage 15, an anterior search database (DB) determiner 16, an array data storage 17, a DB searcher 18, a cache controller 19, a search result storage 20, and an output unit 21. The input unit 11 receives a search request including search conditions from one of the clients and outputs the search request to the condition separator 13. The condition separator 13 separates the search conditions included in the search request received from the input unit 11 into search conditions for individual databases in accordance with an attribute management table (the details of which will be discussed below) stored in the attribute management table storage 12 and in accordance with a search result management table (the details of which will be discussed below) stored in the search result management table storage 15 or data stored in the cache 14. The attribute management table stores, in its record (referred to as an attribute record), information regarding which attribute is managed in which database, the details of which will be discussed below. The search result management table stores, in its record (referred to as a result record) a hit count and a search count, for each of the search conditions for the individual databases. The hit count represents an amount of entity IDs found in a search, such that the attribute value managed in association with the entity IDs in the database satisfies the search condition. The search count represents a total count of past searches. The cache 14 stores copies of some result records. The condition separator 13 stores each of the separated search conditions in association with a database identifier (ID) in an anterior search candidate array or a posterior search DB array (the details of which will be discussed below) stored in the array data storage 17. After the condition separator 13 has separated the search conditions, the anterior search DB determiner 16 determines anterior search databases to be subjected to anterior search in accordance with data stored in the cache 14 or the search result management table storage 15, and data stored in the array data storage 17, and stores information regarding the anterior search databases in an anterior search DB array (the details of which will be discussed below) stored in the array data storage 17. After the anterior search DB determiner 16 has determined the anterior search databases, the DB searcher 18 searches individual databases, first the anterior search databases and then posterior search databases, in accordance with data stored in the array data storage 17 and stores search results in the search result storage 20. The DB searcher 18 further outputs the search conditions or the hit counts included in the search results to the cache controller 19. Upon receiving the search conditions or the hit counts from the DB searcher 18, the cache controller 19 increments the search counts, stored in the cache 14 and in the search result management table, by one or overwrites the hit counts, stored in the cache 14 and in the search result management table, with the received hit counts. After the DB searcher 18 has completed the searches, the output unit 21 outputs data stored in the search result storage 20 to the client which has issued the search request.

FIG. 5 is a diagram illustrating an example of data configuration of an attribute management table stored in an attribute management table storage according to an embodiment of the present invention. In the example illustrated in FIG. 5, each attribute record includes a "database ID" field 502 and an "attribute name" field 504. The "database ID" field 502 of each attribute record is preset with a database ID of each database. The "attribute name" field 504 of the each attribute record is preset with respective attribute names of attributes managed in the each database.

FIG. 6 is a diagram illustrating an example of data configuration of a search result management table stored in a search result management table storage according to an embodiment of the present invention. In the example illustrated in FIG. 6, each result record includes a "search database ID" field 602, a "search condition" field 604, a "hit count" field 606, and a "search count" field 608. The "search database ID" field 602 of each result record contains a database ID of a database searched in a search. The "search condition" field 604 of the each result record contains a condition containing a combination of an attribute name and an attribute value, used in the search. The "hit count" field 606 of the each result record contains a previous hit count of the search. The "search count" field 608 of the each result record contains a search count of the search. Copies of result records containing larger value in the "search count" field 608 are stored in the cache 14 preferentially. The details of this will be discussed below.

FIGS. 7A and 7B illustrate examples of data stored in the array data storage 17. FIG. 7A is a diagram illustrating an example of data configuration of an anterior search candidate array stored in an array data storage according to an embodiment of the present invention. In the example illustrated in FIG. 7A, each record (referred to as a candidate record) of the anterior search candidate array includes a "search condition" field 702, a "search database ID" field 704, and a "hit count" field 706. The "search condition" field 702 of each candidate record contains a condition used in a search. The "search database ID" field 704 of the each candidate record contains a database ID of a database searched in the search. The "hit count" field 706 of the each candidate record contains a previous hit count of the search.

FIG. 7B is a diagram illustrating an example of data configuration of an anterior search DB array stored in an array data storage according to an embodiment of the present invention. In the example illustrated in FIG. 7B, each record (referred to as an anterior search record) of the anterior search DB array includes a "search condition" field 712 and a "search database ID" field 714. The search condition" field 712 of each anterior search record contains a condition to be used in a search. The "search database ID" field 714 of the each anterior search record contains a database ID of a corresponding searched database.

The posterior search DB array stored in the array data storage 17 also has a similar data configuration as illustrated in FIG. 7B.

The operations in the integrated identity management device 1 according to the embodiment will be discussed with reference to FIG. 8 to FIG. 13. FIG. 8 and FIG. 10 to FIG. 12 constitute a diagram illustrating an exemplary flowchart of an integrated identity management device according to an embodiment of the present invention. FIG. 9 is a diagram illustrating an example of separating conditions included in a search request. FIG. 13 is a diagram illustrating an exemplary flowchart of a cache controller of an integrated identity management device according to an embodiment of the present invention.

Figure 8:
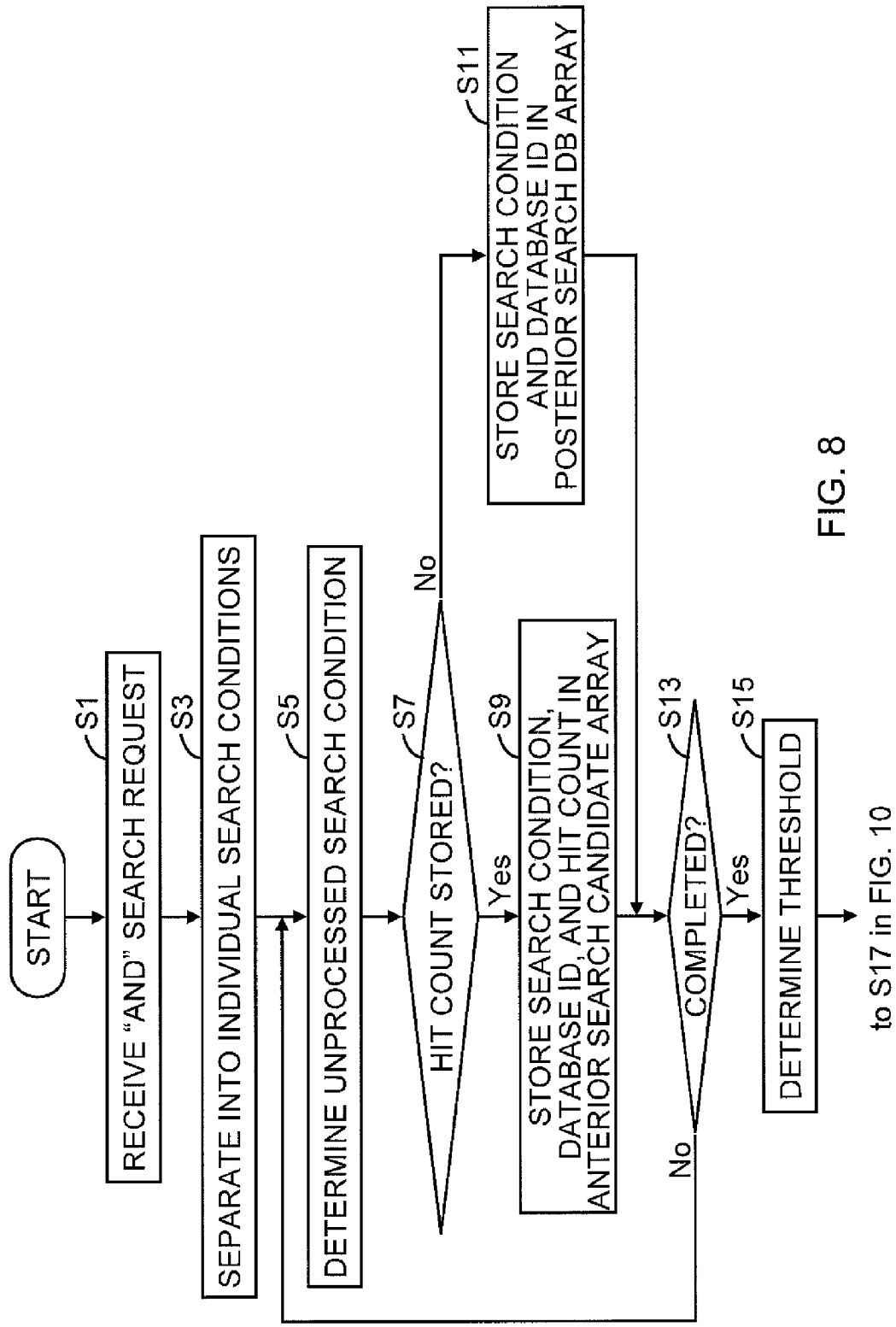
FIG. 8 is a diagram illustrating a part of an exemplary flowchart of an integrated identity management device according to an embodiment of the present invention.
Figure 9:
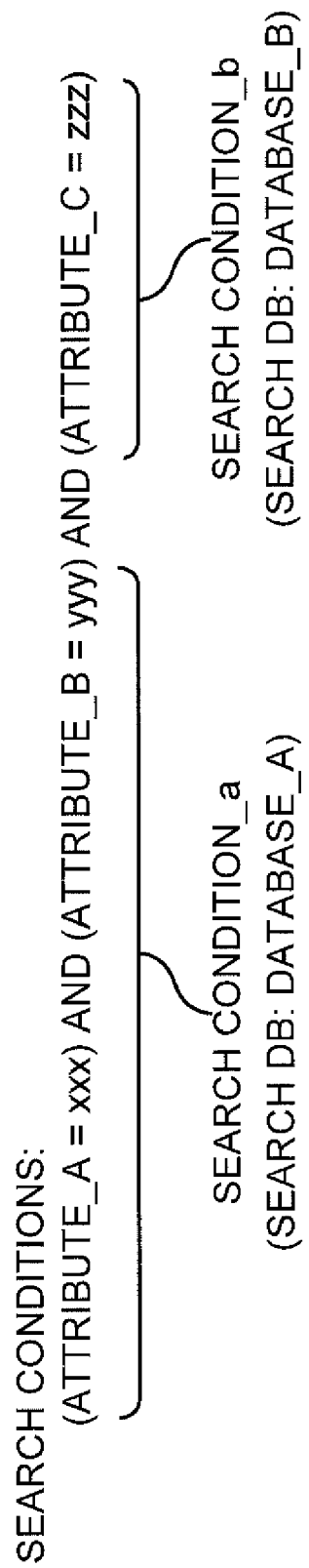
FIG. 9 is a diagram illustrating an example of separating conditions included in a search request.

In operation S1 in FIG. 8, the input unit 11 of the integrated identity management device 1 receives, from one of the clients, an "AND" search request including plural search conditions each of which contains a combination of an attribute name and an attribute value. Then, the input unit 11 outputs the "AND" search request to the condition separator 13.

In operation S3, the condition separator 13 receives the "AND" search request from the input unit 11 and separates search conditions included in the "AND" search request into search conditions for individual databases in accordance with the attribute management table. For example, suppose that the attribute management table stores data illustrated in FIG. 5. When the condition separator 13 has received an "AND" search request including search conditions illustrated in FIG. 9, the condition separator 13 separates the search conditions into a search condition_a, i.e., (attribute_A=xxx) AND (attribute_B=yyy), for the database_A and a search condition_b, i.e., (attribute_C=zzz) for the database_B. The condition separator 13 temporarily stores, in a record (referred to as a condition record) stored in a condition storage, the separated search conditions and respective database IDs of corresponding databases.

In operation S5, the condition separator 13 determines a search condition, which has not been processed, out of the separated search conditions.

In operation S7, the condition separator 13 determines whether the hit count corresponding to the determined search condition has been stored in the cache 14 or the search result management table.

In operation S9, when the hit count corresponding to the determined search condition has been stored in the cache 14 or the search result management table ("Yes" in operation S7), the condition separator 13 stores the determined search condition, a database ID of a corresponding searched database, and the hit count in the anterior search candidate array stored in the array data storage 17. Thereafter, the integrated identity management device 1 advances the process to operation S13.

In operation S11, when the hit count corresponding to the determined search condition has been stored in neither the cache 14 nor the search result management table ("No" in operation S7), the condition separator 13 stores the determined search condition and the database ID of the corresponding searched database in the posterior search DB array stored in the array data storage 17. When the search result management table does not have a result record containing the determined search condition, the condition separator 13 adds, to the search result management table, a new result record containing the determined search condition and the database ID of a corresponding searched database and sets the search count to zero. Thereafter, the integrated identity management device 1 advances the process to operation S13.

In operation S13, the condition separator 13 determines whether all the separated search conditions have been processed. When some of the separated search conditions have not been processed ("No" in operation S13), the integrated identity management device 1 returns the process to operation S5 and repeats the aforementioned operations. When all the separated search conditions have been processed ("Yes" in operation S13), the condition separator 13 outputs to the anterior search DB determiner 16 a notification stating that separation of the search conditions is completed.

In operation S15, upon receiving from the condition separator 13 the notification stating that separation of the search conditions has been completed, the anterior search DB determiner 16 determines a maximum value of the hit counts stored in the anterior search candidate array, to determine an anterior search DB determination threshold on the basis of the determined maximum value. For example, the anterior search DB determiner 16 may determine the product of the maximum value and a predetermined rate (for example, 1%) as being the anterior search DB determination threshold. The method for determining the anterior search DB determination threshold is not limited to this method, and another method may be adopted, for example, determining a value obtained by subtracting a predetermined value from the maximum value as being the anterior search DB determination threshold). Thereafter, the integrated identity management device 1 advances the process to operation S17 in FIG. 10.

Figure 10:
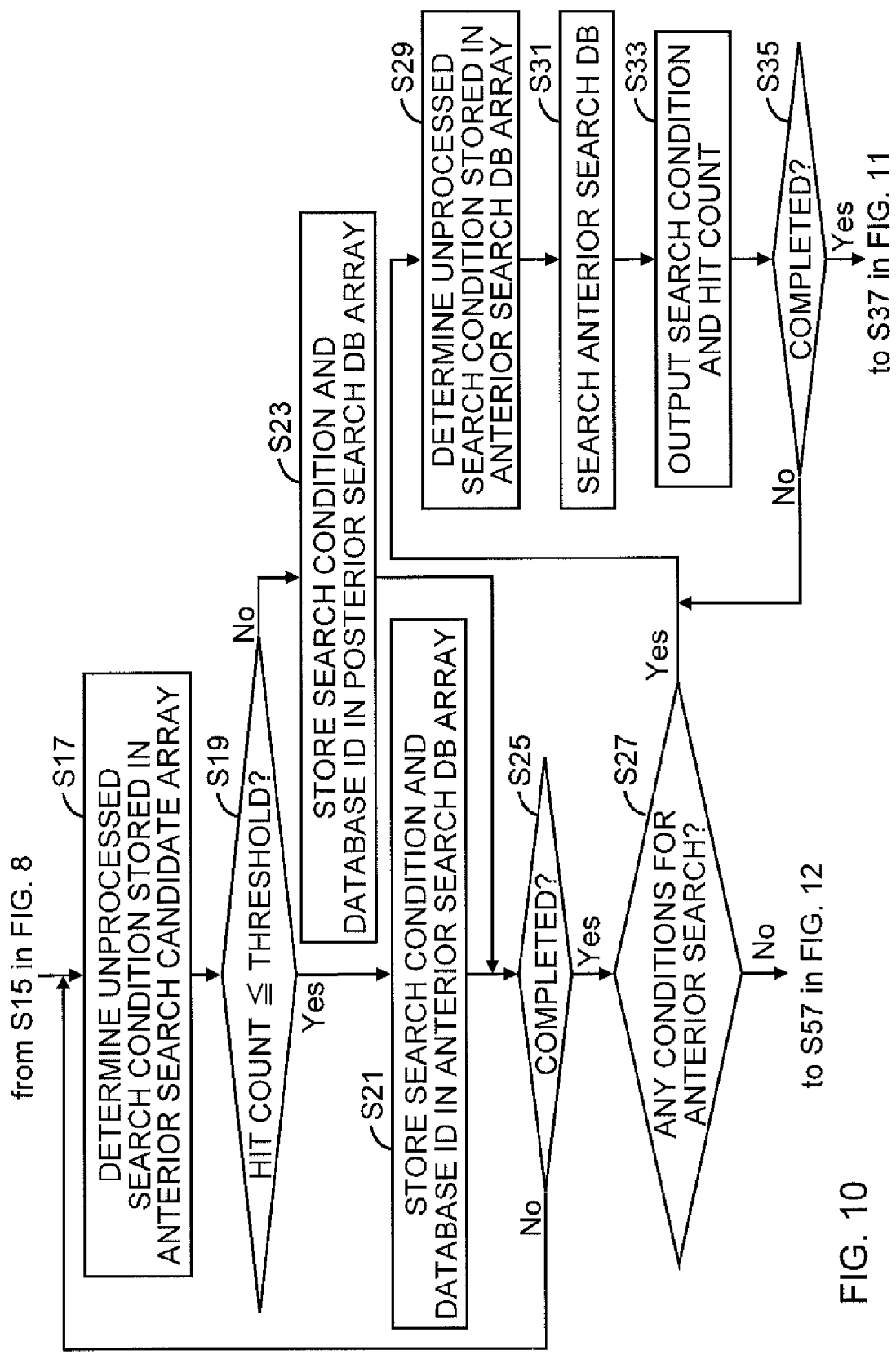
FIG. 10 is a diagram illustrating a part of an exemplary flowchart of an integrated identity management device according to an embodiment of the present invention.

In operation S17 in FIG. 10, the anterior search DB determiner 16 determines a search condition, that has not been processed, stored in the anterior search candidate array.

In operation S19, the anterior search DB determiner 16 determines whether the hit count corresponding to the determined search condition is less than or equal to the anterior search DB determination threshold.

In operation S21, when the hit count corresponding to the determined search condition is less than or equal to the anterior search DB determination threshold ("Yes" in operation S19), the anterior search DB determiner 16 stores the determined search condition and a database ID of a corresponding searched database in the anterior search DB array stored in the array data storage 17. Thereafter, the integrated identity management device 1 advances the process to operation S25.

In operation S23, when the hit count corresponding to the determined search condition exceeds the anterior search DB determination threshold ("No" in operation S19), the anterior search DB determiner 16 stores the determined search condition and the database ID of the corresponding searched database in the posterior search DB array stored in the array data storage 17. Thereafter, the integrated identity management device 1 advances the process to operation S25.

In operation S25, the anterior search DB determiner 16 determines whether all the search conditions stored in the anterior search candidate array have been processed. When some of the search conditions stored in the anterior search candidate array have not been processed ("No" in operation S25), the integrated identity management device 1 returns the process to operation S17, and repeats the aforementioned operations. When all the search conditions stored in the anterior search candidate array have been processed ("Yes" in operation S25), the anterior search DB determiner 16 outputs to the DB searcher 18 a notification stating that anterior search DB determination has been completed.

In operation S27, upon receiving from the anterior search DB determiner 16 the notification stating that anterior search DB determination has been completed, the DB searcher 18 determines whether any search conditions have been stored in the anterior search DB array. When no search condition has been stored in the anterior search DB array ("No" in operation S27), the integrated identity management device 1 advances the process to operation S57 in FIG. 12.

In operation S29, when some search conditions have been stored in the anterior search DB array ("Yes" in operation S27), the DB searcher 18 determines a search condition, that has not been processed, stored in the anterior search DB array.

In operation S31, the DB searcher 18 searches a corresponding anterior search database by the determined search condition. For example, the DB searcher 18 outputs a search request including the determined search condition to the anterior search database. Then, the DB searcher 18 stores a search result returned from the anterior search database in association with the database ID of the anterior search database in the search result storage 20.

In operation S33, the DB searcher 18 outputs the determined search condition and a hit count included in the search result to the cache controller 19. Upon receiving the search condition and the hit count, the cache controller 19 updates the cache 14 and the search result management table. The details of this will be discussed below.

In operation S35, the DB searcher 18 determines whether all the search conditions stored in the anterior search DB array have been processed. When some of the search conditions stored in the anterior search DB array have not been processed ("No" in operation S35), the integrated identity management device 1 returns the process to operation S29, and repeats the aforementioned operations. When all the search conditions stored in the anterior search DB array have been processed ("Yes" in operation S35), the integrated identity management device 1 advances the process to operation S37 in FIG. 11. When plural anterior search databases have been stored in the anterior search DB array, the DB searcher 18 may output respective search requests all together to the plural anterior search databases to search the plural anterior search databases in parallel.

Figure 11:
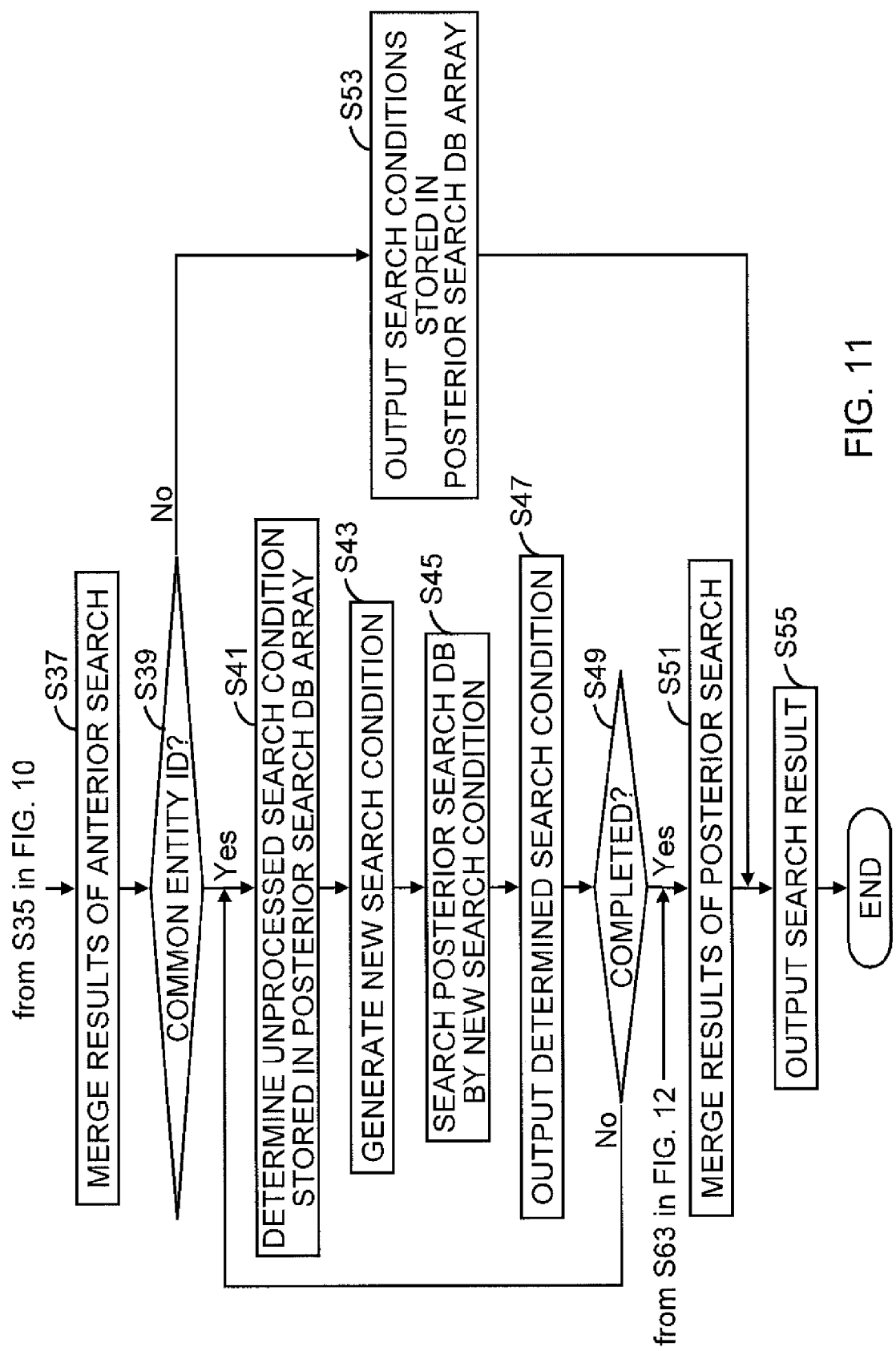
FIG. 11 is a diagram illustrating a part of an exemplary flowchart of an integrated identity management device according to an embodiment of the present invention.

In operation S37 in FIG. 11, the DB searcher 18 merges, to obtain an anterior search result, the search results returned from the anterior search databases, stored in the search result storage 20. That is, the DB searcher 18 determines entity IDs included in common in the search results of anterior search.

In operation S39, the DB searcher 18 determines whether any entity IDs are included in common in the search results of anterior search. When some entity IDs are included in common in the search results of anterior search ("Yes" in operation S39), the DB searcher 18 starts to search posterior search databases as follows.

In operation S41, the DB searcher 18 determines a search condition, that has not been processed, stored in the posterior search DB array.

In operation S43, the DB searcher 18 generates a new search condition by adding the entity IDs obtained in anterior search to the determined search condition.

In operation S45, the DB searcher 18 searches a corresponding posterior search database by the generated new search condition. For example, the DB searcher 18 outputs a search request including the determined search condition and the entity IDs obtained in anterior search to the posterior search database. Then, the DB searcher 18 stores a search result returned from the posterior search database in association with the database ID of the posterior search database in the search result storage 20.

In operation S47, the DB searcher 18 outputs the determined search condition to the cache controller 19. The cache controller 19 increments the search counts, for the determined search condition, stored in the cache 14 and in the search result management table by one. The hit count of the determined search condition stored in the cache 14 and in the search result management table may not be updated, since the search range of posterior search in operation S45 is narrowed down using the entity IDs obtained in anterior search. Thus, the DB searcher 18 does not output the hit count included in the search result to the cache controller 19 in operation S47.

In operation S49, the DB searcher 18 determines whether all the search conditions stored in the posterior search DB array have been processed. When some of the search conditions stored in the posterior search DB array have not been processed ("No" in operation S49), the integrated identity management device 1 returns the process to operation S41, and repeats the aforementioned operations. When all the search conditions stored in the posterior search DB array have been processed ("Yes" in operation S49), the integrated identity management device 1 advances the process to operation S51. When plural posterior search databases have been stored in the posterior search DB array, the DB searcher 18 may output respective search requests all together to the plural posterior search databases to search the plural posterior search databases in parallel.

In operation S51, the DB searcher 18 merges, to obtain a posterior search result, the search results returned from the posterior search databases, stored in the search result storage 20. That is, the DB searcher 18 determines entity IDs included in common in the search results of posterior search. The posterior search result is stored in the search result storage 20 as a final search result. Then, the DB searcher 18 requests the output unit 21 to output the final search result. Thereafter, the integrated identity management device 1 advances the process to operation S55.

In operation S53, when no entity ID is included in common in the search results of anterior search ("No" in operation S39), the DB searcher 18 outputs the search conditions stored in the posterior search DB array to the cache controller 19. The search is terminated without searching any posterior search databases when no entity ID is included in common in the search results of anterior search. In this arrangement, when no data satisfying search conditions exists after anterior search, the search is terminated without searching any posterior search database, and thus useless search need not be performed. However, the search counts stored in the cache 14 and in the search result management table may be incremented by one, since each of the search conditions stored in the posterior search DB array has been specified in the search request. Thereafter, the DB searcher 18 requests the output unit 21 to output the search result stored in the search result storage 20.

In operation S55, the output unit 21 outputs the search result stored in the search result storage 20 to the client that has issued the "AND" search request in response to the request from the DB searcher 18. For example, when there is an entity ID such that the attribute value managed in association with the entity IDs in some database satisfies the search conditions specified in the "AND" search request, integrated identity data, such as illustrated in FIG. 2, regarding the entity ID is output to the client as a search result. When there is no entity ID such that the attribute value managed in association with the entity IDs in some database satisfies the search conditions specified in the "AND" search request, a notification to that effect is output as a search result. Thereafter, the integrated identity management device 1 terminates the process.

Figure 12:
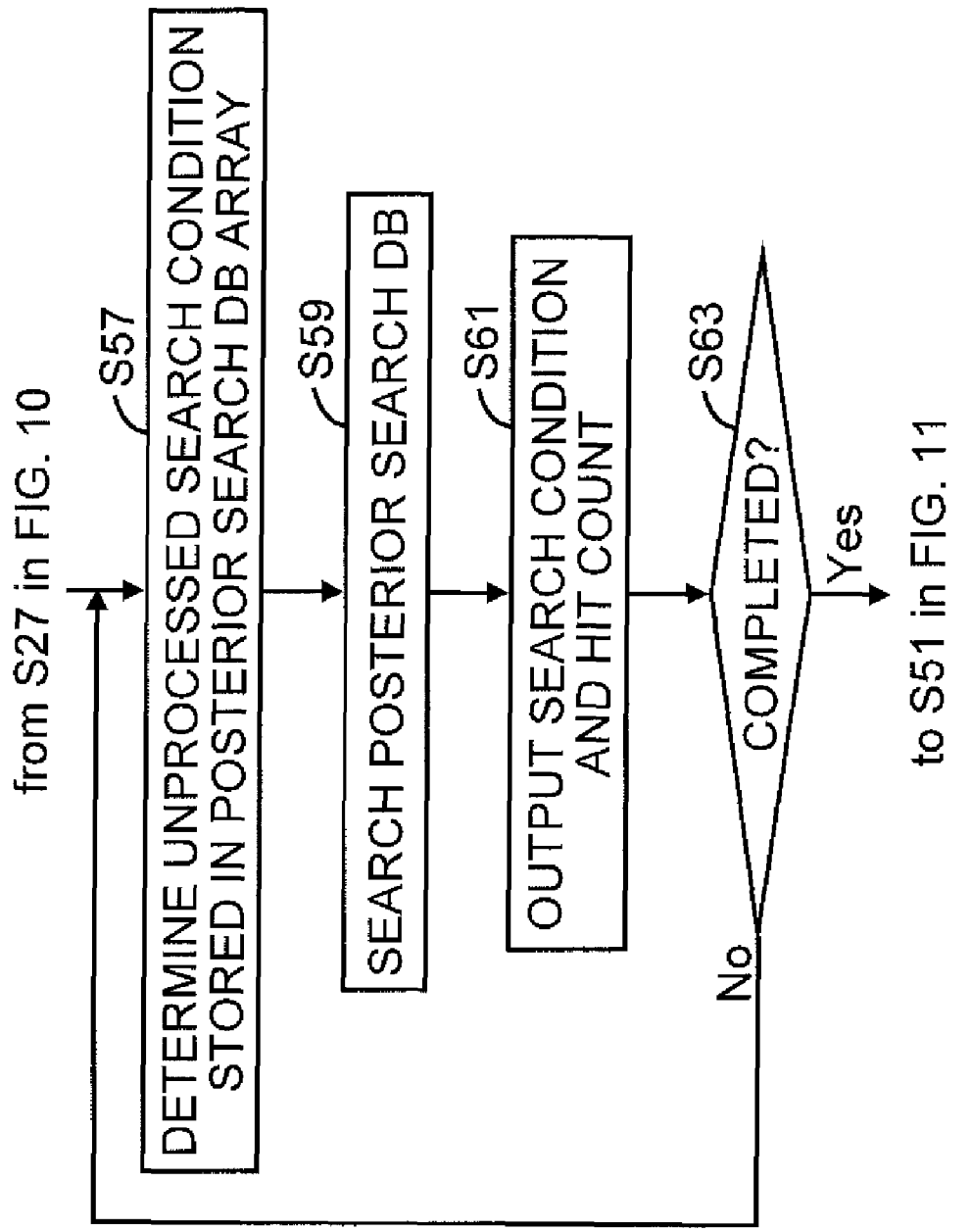
FIG. 12 is a diagram illustrating a part of an exemplary flowchart of an integrated identity management device according to an embodiment of the present invention.
Figure 13:
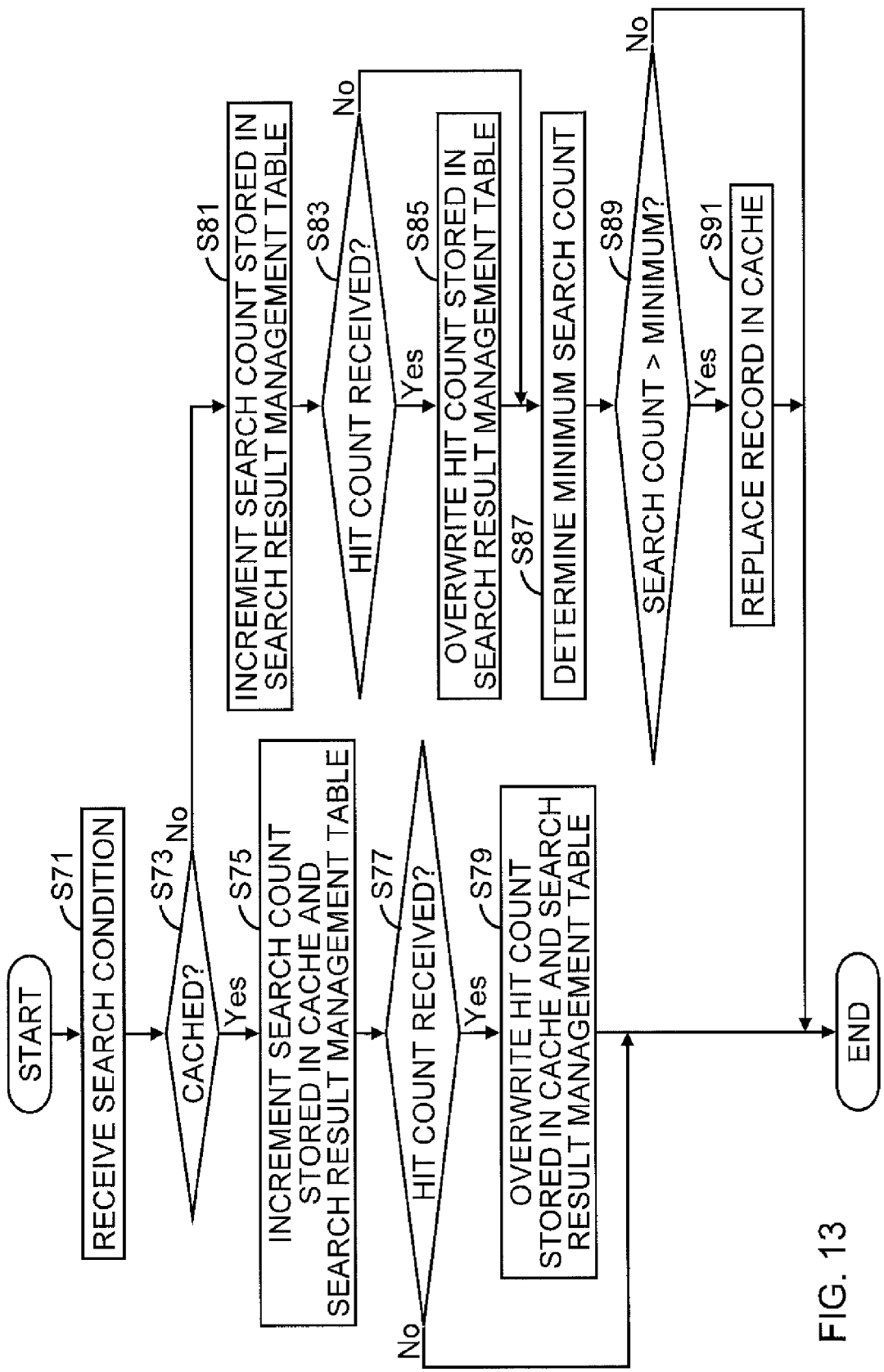
FIG. 13 is a diagram illustrating an exemplary flowchart of a cache controller of an integrated identity management device according to an embodiment of the present invention.

In operation S57 in FIG. 12, when the DB searcher 18 has determined that no search condition has been stored in the anterior search DB array ("No" in operation S27 in FIG. 10), the DB searcher 18 determines a search condition, that has not been processed, stored in the posterior search DB array.

In operation S59, the DB searcher 18 searches a corresponding posterior search database by the determined search condition. For example, the DB searcher 18 outputs a search request including the determined search condition to the posterior search database. Then, the DB searcher 18 stores a search result returned from the posterior search database in association with the database ID of the posterior search database in the search result storage 20.

In operation S61, the DB searcher 18 outputs the determined search condition and the hit count included in the search result to the cache controller 19. That is, the cache controller 19 is caused to update the cache 14 and the search result management table.

In operation S63, the DB searcher 18 determines whether all the search conditions stored in the posterior search DB array have been processed. When some of the search conditions stored in the posterior search DB array have not been processed ("No" in operation S63), the integrated identity management device 1 returns the process to operation S57, and repeats the aforementioned operations. When all the search conditions stored in the posterior search DB array have been processed ("Yes" in operation S63), the integrated identity management device 1 advances the process to operation S51 in FIG. 11, and the integrated identity management device 1 terminates the process after operation S51 and operation S55 are performed. When plural posterior search databases have been stored in the posterior search DB array, the DB searcher 18 may output respective search requests all together to the plural posterior search databases to search the plural posterior search databases in parallel.

By performing the aforementioned operations, the anterior search databases having a small hit count in past search may be searched first, and the search range of the posterior search databases may be narrowed down using entity IDs obtained in anterior search. Thus, efficient cross search may be performed, because the percentage of useless data that is not included in a final search result decreases in search results returned from posterior search databases, and because time to merge the search results is shortened. Moreover, useless search need not be performed because search is terminated without searching any posterior search databases when there is no entity ID included in common in the search results of anterior search.

In the aforementioned example, an anterior search DB determination threshold is determined, and anterior search databases are determined in accordance with the anterior search DB determination threshold. Alternatively, for example, candidate records may be sorted in accordance with the hit count, and databases corresponding to the candidate records containing a hit count within predetermined lowest ranks may be determined as anterior search databases. Alternatively, for example, when there is no candidate record containing a hit count less than or equal to an anterior search DB determination threshold, candidate records may be sorted in accordance with the hit count, and databases corresponding to the candidate records containing a hit count within predetermined lowest ranks may be determined as anterior search databases.

The operations of the cache controller 19 of the integrated identity management device 1 will be discussed with reference to FIG. 13. As discussed above, the DB searcher 18 outputs the search condition to the cache controller 19 in operation S33, operation S47, operation S53, and operation S61.

In operation S71 in FIG. 13, the cache controller 19 receives the search condition from the DB searcher 18.

In operation S73, the cache controller 19 determines whether a result record containing the received search condition has been stored in the cache 14.

In operation S75, when a result record containing the received search condition has been stored in the cache 14 ("Yes" in operation S73), the cache controller 19 increments, in each of the cache 14 and the search result management table, the search count contained in the result record containing the received search condition by one.

In operation S77, the cache controller 19 determines whether the cache controller 19 has received the hit count, together with the search condition. As discussed above, the DB searcher 18 outputs the hit count, together with the search condition, to the cache controller 19 in operation S33 and operation S61.

In operation S79, when the cache controller 19 has received the hit count, together with the search condition ("Yes" in operation S77), the cache controller 19 overwrites, in each of the cache 14 and the search result management table, the hit count stored in the result record containing the received search condition, with the received hit count. Thereafter, the integrated identity management device 1 terminates the process. When the cache controller 19 has not received the hit count, together with the search condition ("No" in operation S77), the integrated identity management device 1 skips operation S79, and terminates the process.

In operation S81, when no result record containing the received search condition has been stored in the cache 14 ("No" in operation S73), the cache controller 19 increments, in the search result management table, the search count of the result record containing the received search condition by one.

In operation S83, the cache controller 19 determines whether the cache controller 19 has received the hit count, together with the search condition.

In operation S85, when the cache controller 19 has received the hit count, together with the search condition ("Yes" in operation S83), the cache controller 19 overwrites, in the search result management table, the hit count stored in the result record containing the received search condition, with the received hit count. Thereafter, the integrated identity management device 1 advances the process to operation S87. When the cache controller 19 has not received the hit count, together with the search condition ("No" in operation S83), the integrated identity management device 1 skips operation S85, and advances the process to operation S87.

In operation S87, the cache controller 19 determines a minimum search count contained in result records stored in the cache 14.

In operation S89, the cache controller 19 determines whether a search count contained in a result record, of the search result management table, containing the received search condition is greater than the minimum search count.

In operation S91, when the search count contained in the result record containing the received search condition is greater than the minimum search count ("Yes" in operation S89), the cache controller 19 replaces, in the cache 14, the result record containing the minimum search count with the result record containing the received search condition. Thereafter, the integrated identity management device 1 terminates the process. When the search count contained in the result record containing the received search condition is less than or equal to the minimum search count ("No" in operation S89), the integrated identity management device 1 skips operation S91, and terminates the process.

By performing the aforementioned operations, the hit count included in the result of the previous search may be used in determining anterior search databases. Since result records containing search conditions that are frequently used in search are stored in the cache 14, the search speed may be improved.

Figure 14:
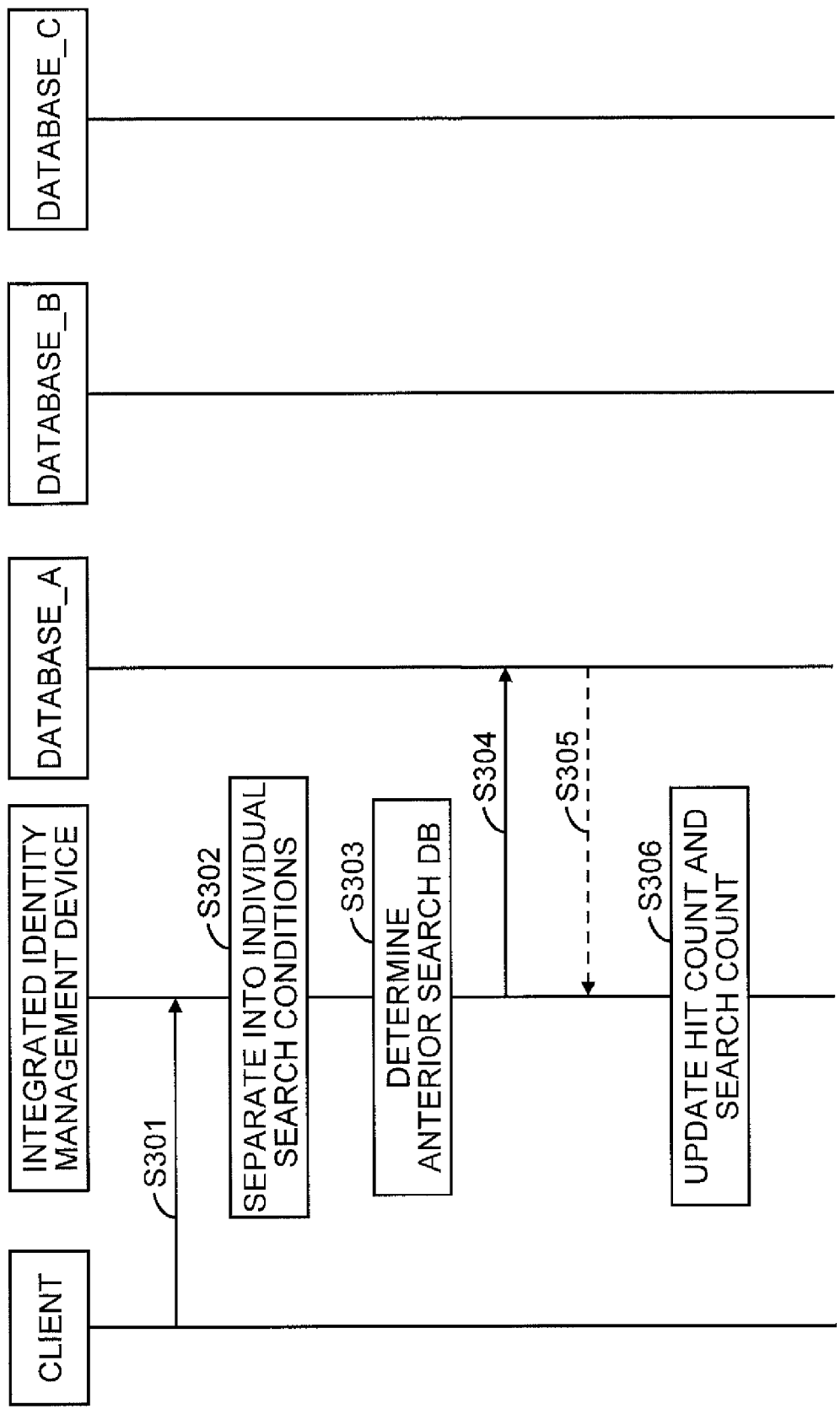
FIG. 14 is a diagram illustrating a part of an exemplary sequence of operations in an integrated identity management device according to an embodiment of the present invention.
Figure 15:
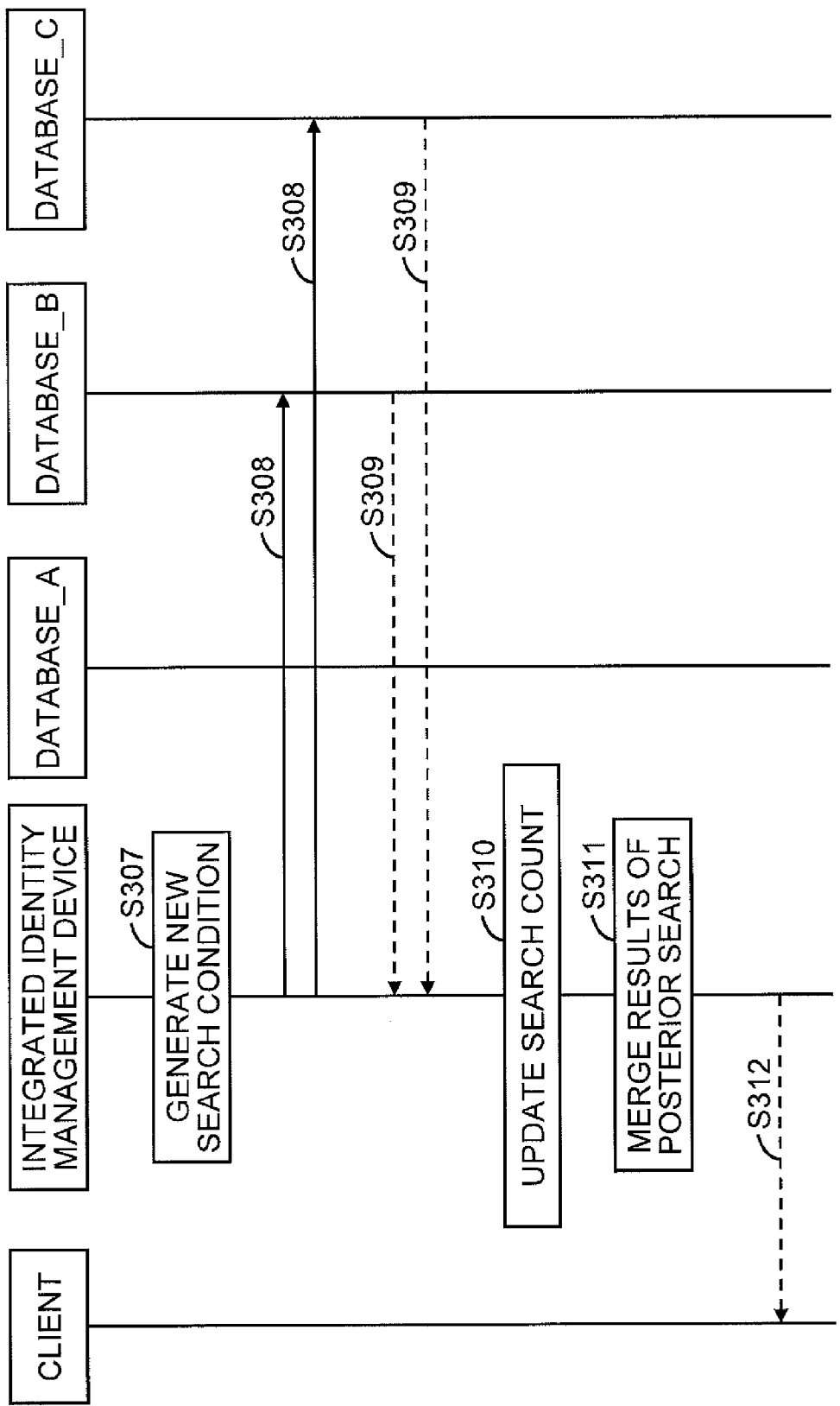
FIG. 15 is a diagram illustrating a part of an exemplary sequence of operations in an integrated identity management device according to an embodiment of the present invention.

FIG. 14 to FIG. 17 are diagrams illustrating exemplary sequences of operations in an integrated identity management device according to an embodiment of the present invention. FIG. 14 and FIG. 15 illustrate an exemplary sequence in a case where the database_A is determined to be an anterior search database, and the database_B and the database_C are searched by a condition including the search result of the database_A.

In operation S301 in FIG. 14, the integrated identity management device 1 receives a search request including plural search conditions from one of the clients. This operation corresponds to operation S1 in FIG. 8.

In operation S302, the integrated identity management device 1 separates the search conditions included in the search request into search conditions for individual databases. This operation corresponds to operation S3 in FIG. 8.

In operation S303, the integrated identity management device 1 determines anterior search databases in accordance with the hit counts. This operation corresponds to operation S5 in FIG. 8 to operation S25 in FIG. 10. In this case, it is assumed that the database_A is determined to be an anterior search database. Thus, the search order is "database_A" in first and then "database_B and database_C".

In operation S304, the integrated identity management device 1 searches (in anterior search) the database_A, by a search condition for the database_A. This operation corresponds to operation S29 and operation S31 in FIG. 10.

In operation S305, the integrated identity management device 1 obtains a search result. This operation also corresponds to operation S31 in FIG. 10.

In operation S306, the integrated identity management device 1 updates the search count and the hit count regarding the search condition for the database_A. This operation corresponds to operation S33 in FIG. 10.

In operation S307 in FIG. 15, the integrated identity management device 1 generates a new search condition by adding entity IDs obtained in anterior search to each of the search condition for the database_B and the search condition for the database_C. This operation corresponds to operation S41 and operation S43 in FIG. 11.

In operation S308, the integrated identity management device 1 searches (in posterior search) the database_B and the database_C, by the generated respective search condition. That is, each of the database_B and the database_C is searched, narrowing down the search range using the entity IDs obtained in anterior search. This operation corresponds to operation S45 in FIG. 11.

In operation S309, the integrated identity management device 1 obtains search results. This operation also corresponds to operation S45 in FIG. 11.

In operation S310, the integrated identity management device 1 updates the search count regarding the search condition for each of the database_B and the database_C. This operation corresponds to operation S47 in FIG. 11.

In operation S311, the integrated identity management device 1 merges the search results returned from the database_B and the database_C to store a final search result. This operation corresponds to operation S51 in FIG. 11.

In operation S312, the integrated identity management device 1 outputs the final search result to the one of the clients that has issued the search request and terminates the process. This operation corresponds to operation S55 in FIG. 11.

Figure 16:
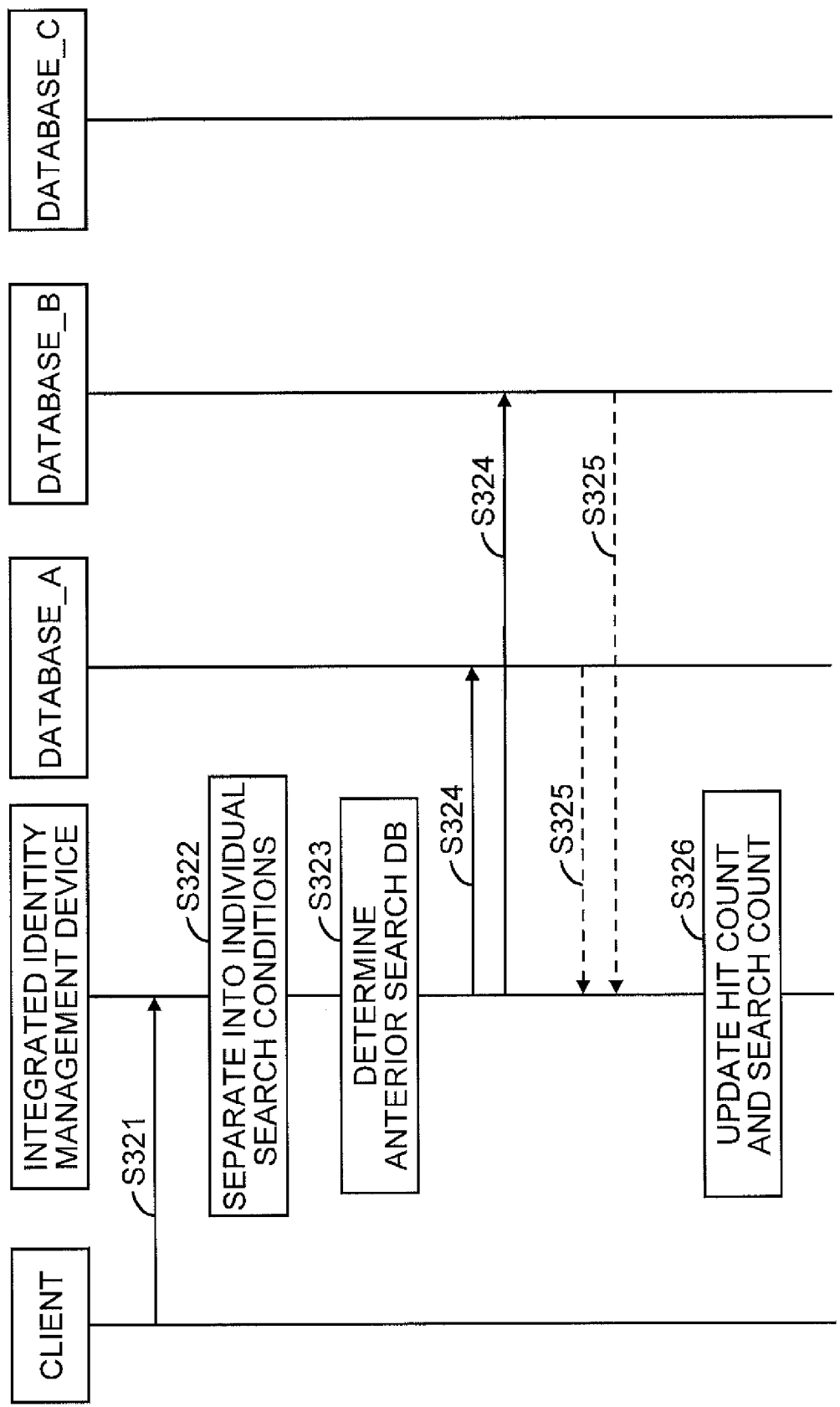
FIG. 16 is a diagram illustrating a part of an exemplary sequence of operations in an integrated identity management device according to an embodiment of the present invention.
Figure 17:
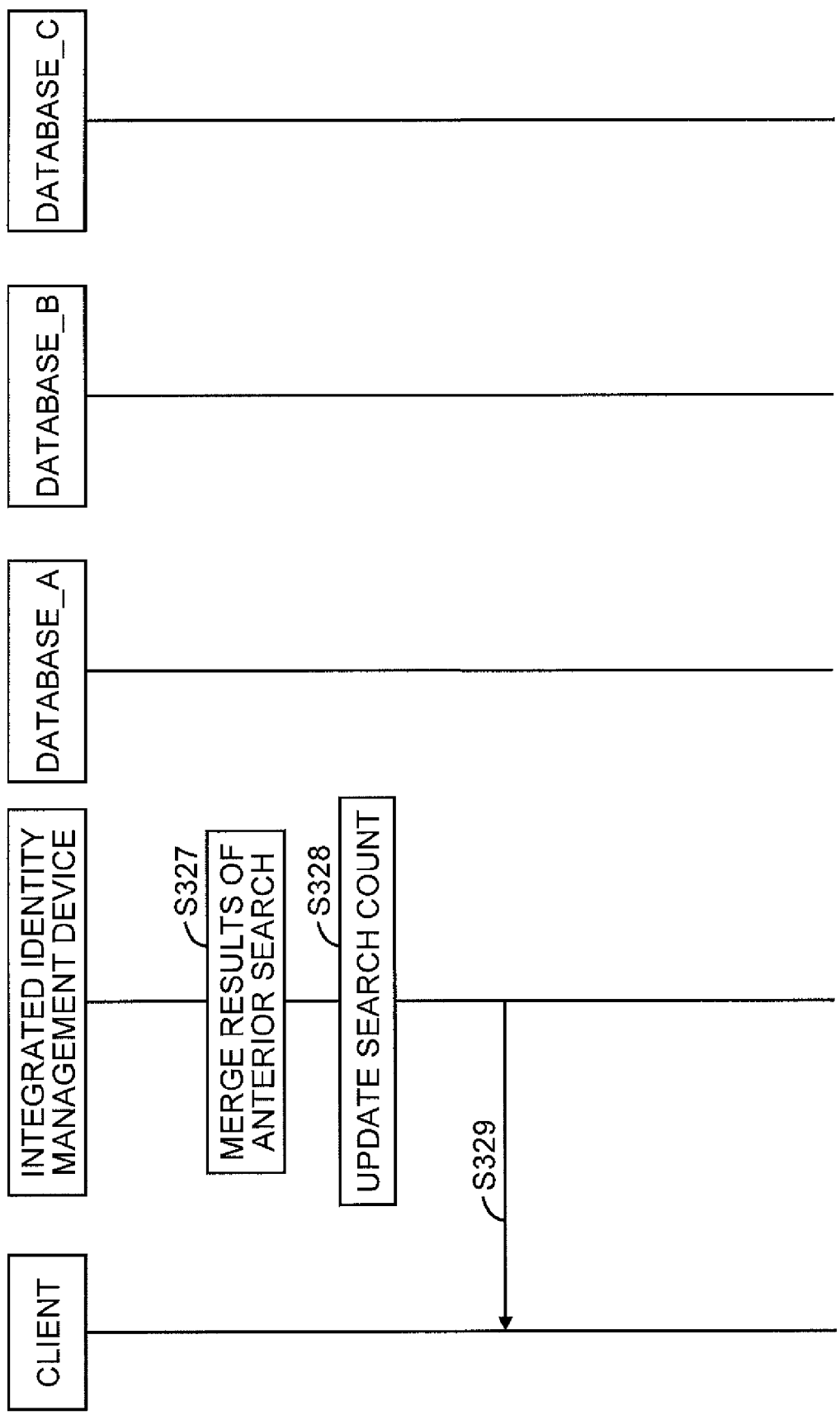
FIG. 17 is a diagram illustrating a part of an exemplary sequence of operations in an integrated identity management device according to an embodiment of the present invention.

FIG. 16 and FIG. 17 illustrate an exemplary sequence in a case where the database_A and the database_B are determined to be anterior search databases, and the search results returned from the database_A and the database_B have no entity ID in common.

In operation S321 in FIG. 16, the integrated identity management device 1 first receives a search request including plural search conditions from one of the clients. This operation corresponds to operation S1 in FIG. 8.

In operation S322, the integrated identity management device 1 separates the search conditions included in the search request into search conditions for the individual databases. This operation corresponds to operation S3 in FIG. 8.

In operation S323, the integrated identity management device 1 determines anterior search databases in accordance with the hit counts. This operation corresponds to operation S5 in FIG. 8 to operation S25 in FIG. 10. In this case, it is assumed that the database_A and the database_B are determined to be anterior search databases. Thus, the search order is "database_A and database_B" in first and then "database_C".

In operation S324, the integrated identity management device 1 searches (in anterior search) the database_A and the database_B, by a search condition for each of the database_A and the database_B. This operation corresponds to operation S29 and operation S31 in FIG. 10.

In operation S325, the integrated identity management device 1 obtains search results. This operation also corresponds to operation S31 in FIG. 10.

In operation S326, the integrated identity management device 1 updates the search count and the hit count regarding the search condition for each of the database_A and the database_B. This operation corresponds to operation S33 in FIG. 10.

In operation S327 in FIG. 17, the integrated identity management device 1 merges the search results returned from the database_A and the database_B. This operation corresponds to operation S37 in FIG. 11. In this case, it is assumed that the search results returned from the database_A and the database_B include no entity ID in common.

In operation S328, the integrated identity management device 1 updates the search count regarding the search condition for the database_C. When the search results returned from the database_A and the database_B include no entity ID in common, the database_C may not be searched. However, since the search condition for the database_C is specified in the search request, the search count regarding the search condition for the database_C is updated. This operation corresponds to operation S53 in FIG. 11.

In operation S329, the integrated identity management device 1 outputs a search result with no hit data to the one of the clients that has issued the search request and terminates the process. This operation corresponds to operation S55 in FIG. 11.

As discussed above, according to the embodiment, plural databases may be efficiently cross-searched.

Second Embodiment

In the first embodiment discussed above, the integrated identity management device 1 outputs search requests to individual databases to obtain search results. However, some databases such as databases of presence systems do not have a search function. For such databases, search by specifying a search condition (i.e., an attribute name and an attribute value) may not be performed. Thus, the integrated identity management device 1 may determine entity IDs associated with data that satisfy the search condition by obtaining all data related to each entity ID. In a second embodiment, even when some databases do not have a search function, efficient cross search across plural databases may be enabled. The second embodiment will be discussed with reference to FIG. 18 to FIG. 28.

Figure 18:
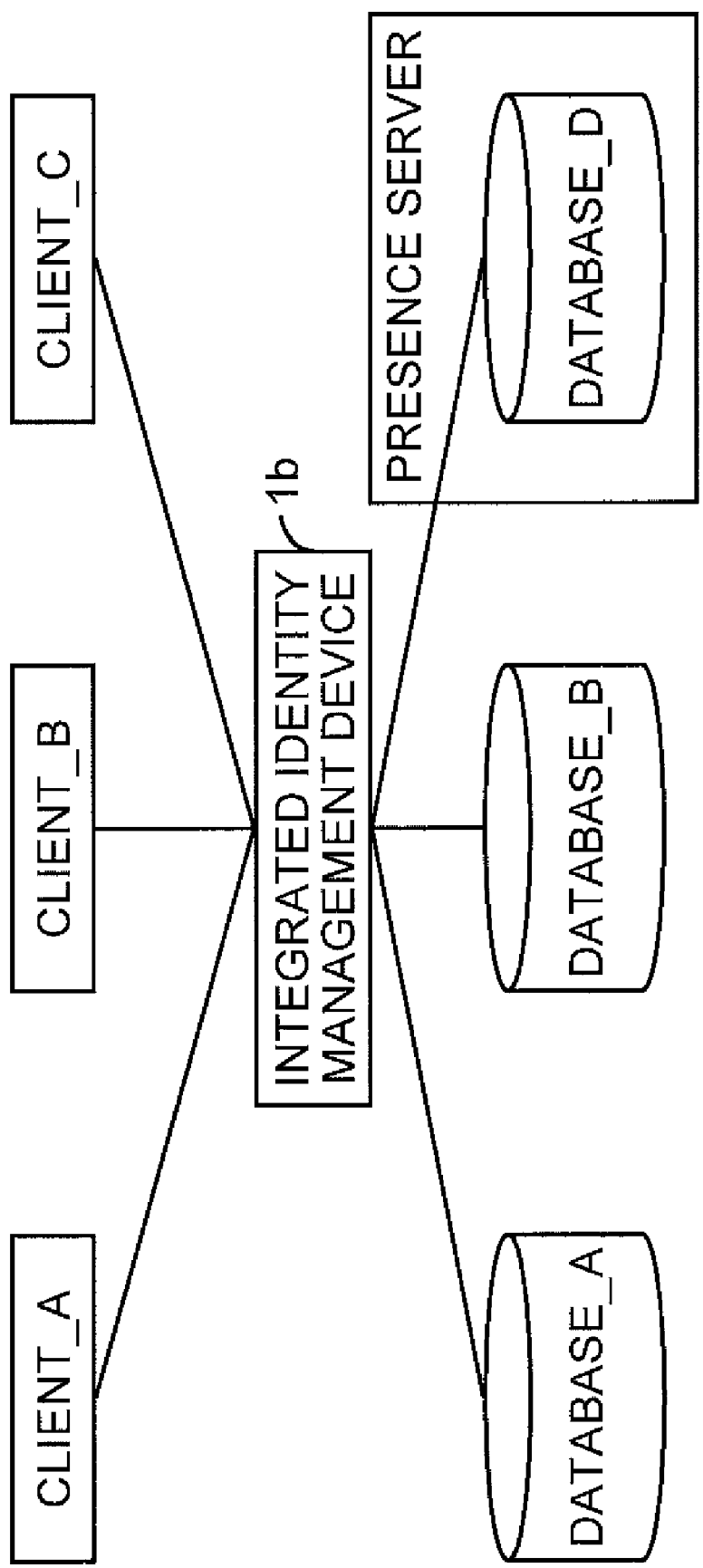
FIG. 18 is a diagram illustrating a configuration of an example an integrated identity management system according to an embodiment of the present invention.

FIG. 18 is a diagram illustrating a configuration of an example an integrated identity management system according to an embodiment of the present invention. As illustrated in FIG. 18, an integrated identity management device 1b is connected to plural databases (database_A, database_B, and database_D in FIG. 18) and plural clients (client_A to client_C in FIG. 18) that use integrated identity data such as illustrated in FIG. 2. It is assumed that the database_D is a database (hereinafter referred to as a presence database) managed by a presence server.

Figure 19:
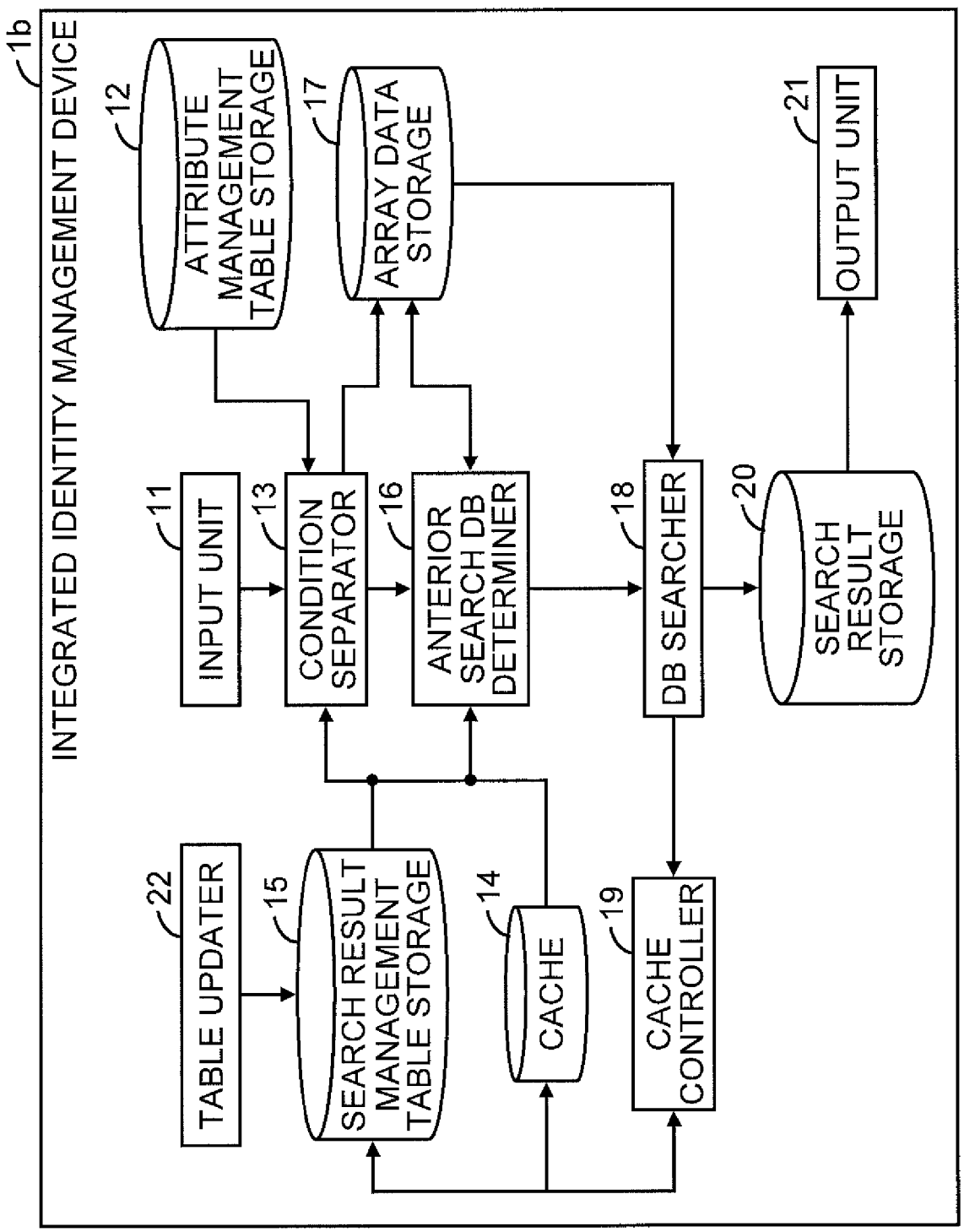
FIG. 19 is a block diagram illustrating an example of a system configuration of an integrated identity management device according to an embodiment of the present invention.

FIG. 19 is a block diagram illustrating an example of a system configuration of an integrated identity management device according to an embodiment of the present invention. The integrated identity management device 1b includes an input unit 11, an attribute management table storage 12, a condition separator 13, a cache 14, a search result management table storage 15, an anterior search DB determiner 16, an array data storage 17, a DB searcher 18, a cache controller 19, a search result storage 20, an output unit 21, and a table updater 22. That is, the integrated identity management device 1b may be obtained by adding the table updater 22 to the integrated identity management device 1 according to the first embodiment. The table updater 22 updates a search result management table in response to a presence update notification (the details of which will be discussed below) received from the presence server.

FIG. 20 is a diagram illustrating an example of data configuration of a search result management table stored in a search result management table storage according to an embodiment of the present invention. In the embodiment, a search result management table as illustrated in FIG. 20 is stored in the search result management table storage 15. In the example illustrated in FIG. 20, each result record includes a "search database ID" field 2002, a "search condition" field

Figure 21:
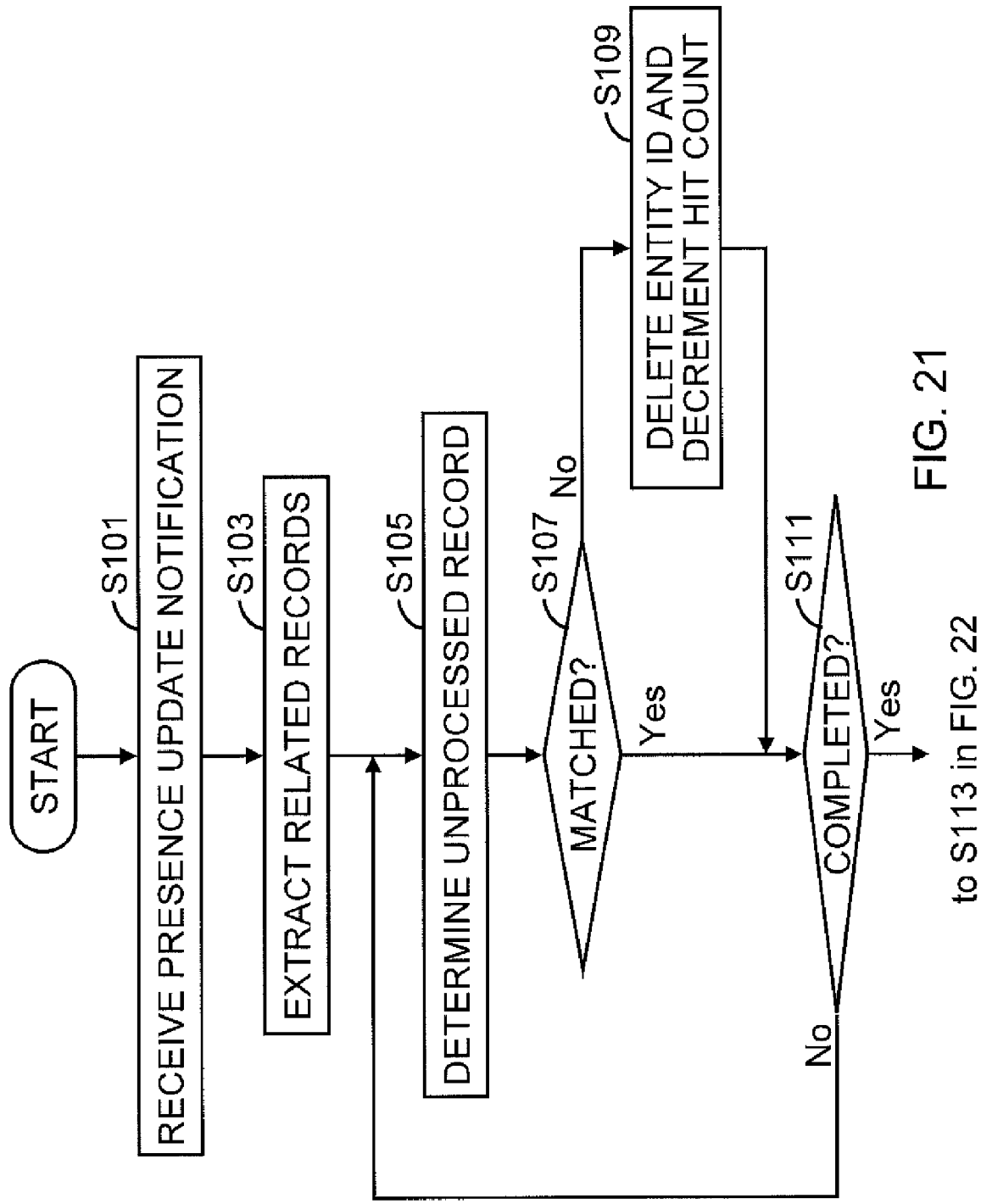
FIG. 21 is a diagram illustrating a part of an exemplary flowchart of operations for updating a search result management table performed by an integrated identity management device according to an embodiment of the present invention.
Figure 22:
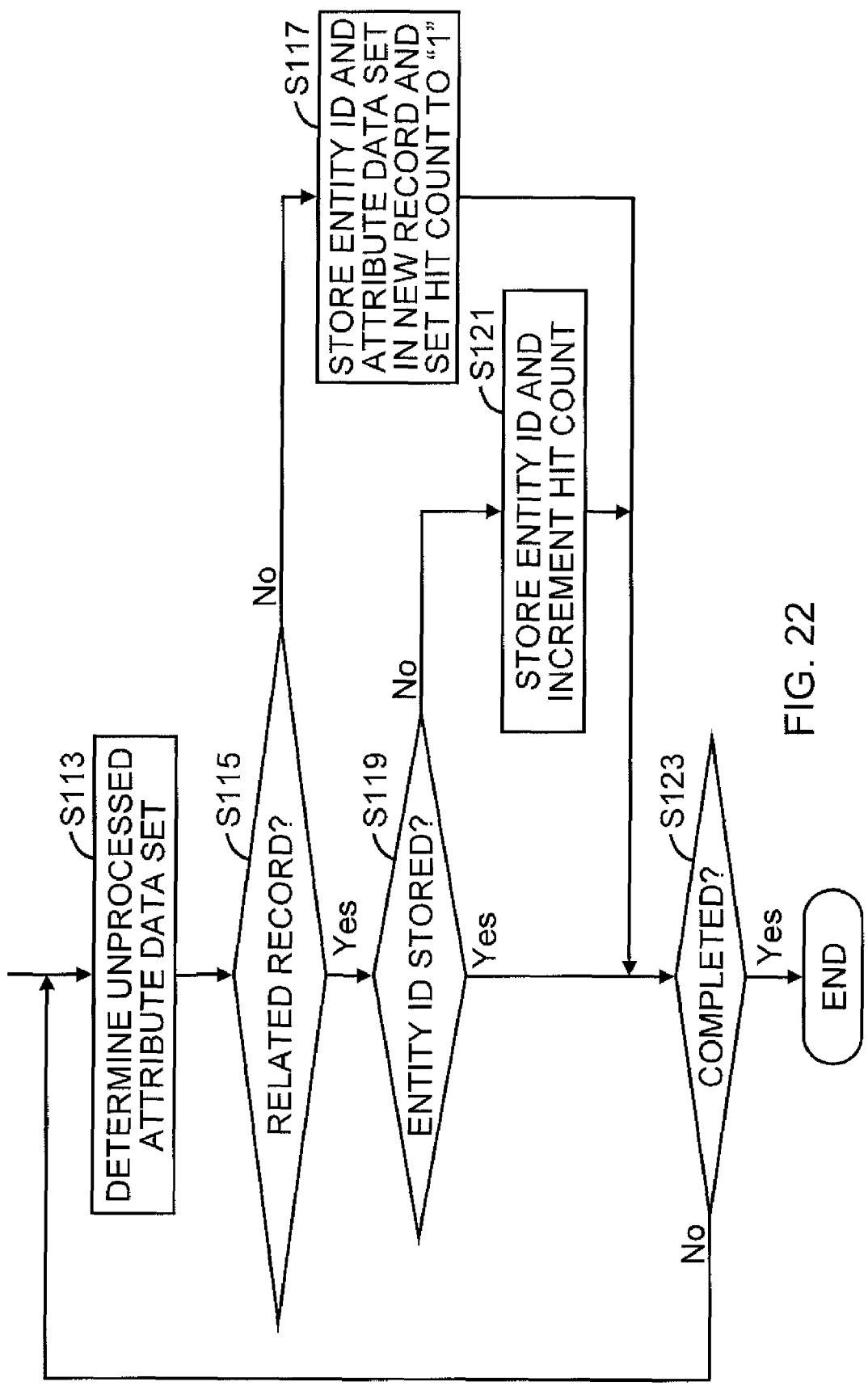
FIG. 22 is a diagram illustrating a part of an exemplary flowchart of operations for updating a search result management table performed by an integrated identity management device according to an embodiment of the present invention.

2004, a "hit count" field 2006, a "search count" field 2008, and a "hit ID" field 2010. That is, the search result management table according to the second embodiment may be obtained by adding the "hit ID" field 2010 to the search result management table according to the first embodiment. The "hit ID" field 2010 of the each result record contains an entity IDs notified from the presence server in association with the attribute name and the attribute value stored in the "search condition" field 2004 when the database identified with the database ID stored in the "search database ID" field 2002 is a presence database. FIG. 21 and FIG. 22 illustrate an exemplary flowchart of operations for updating a search result management table performed by an integrated identity management device according to an embodiment of the present invention. The operations for updating the search result management table will be discussed with reference to FIG. 21 and FIG. 22.

For example, when the presence database has been updated, the presence server managing the presence database sends a presence update notification to the integrated identity management device 1b. The presence update notification includes an entity ID and an attribute data set including the attribute name and the attribute value of presence data associated with the entity ID. The presence update notification may include plural attribute data sets.

In operation S101 in FIG. 21, the input unit 11 in the integrated identity management device 1b receives a presence update notification from the presence server and outputs the presence update notification to the table updater 22.

In operation S103, the table updater 22 extracts, from the search result management table, result records containing the entity ID related to the presence update notification upon receiving the presence update notification from the input unit 11.

In operation S105, the table updater 22 determines a result record that has not been processed, out of the extracted result records.

In operation S107, the table updater 22 determines whether any one of the attribute data sets included in the presence update notification matches the search condition stored in the "search condition" field 2004 of the determined result record. When one of the attribute data sets included in the presence update notification matches the search condition stored in the "search condition" field 2004 of the determined result record ("Yes" in operation S107), the integrated identity management device 1b advances the process to operation S111.

In operation S109, when no attribute data set included in the presence update notification matches the search condition stored in the "search condition" field 2004 of the determined result record ("No" in operation S107), the table updater 22 deletes the entity ID related to the presence update notification from the determined result record and decrements the hit count stored in the "hit count" field 2006 of the determined result record by one. This operation is for deleting, when a change has been occurred in the attribute value of a certain attribute, the entity ID from a result record related to the attribute data set before the change. Thereafter, the integrated identity management device 1b advances the process to operation S111.

In operation S111, the table updater 22 determines whether all the extracted result records have been processed. When some of the extracted records have not been processed ("No" in operation S111), the integrated identity management device 1b returns the process to operation S105, and repeats the aforementioned operations. When all the extracted result records have been processed ("Yes" in operation S111), the integrated identity management device 1b advances the process to operation S113 in FIG. 22.

In operation S113 in FIG. 22, the table updater 22 determines an attribute data set that has not been processed, out of the plural attribute data sets included in the presence update notification.

In operation S115, the table updater 22 determines whether the search result management table includes a result record containing the determined attribute data set in the "search condition" field 2004.

In operation S117, when the search result management table includes no result record containing the determined attribute data set in the "search condition" field 2004 ("No" in operation S115), the table updater 22 adds, to the search result management table, a new result record containing the determined attribute data set in the "search condition" field 2004. The table updater 22 stores the entity ID related to the presence update notification in the "hit ID" field 2010 of the new result record, and sets the hit count to one. This operation is for adding a new result record to the search result management table when a new attribute data set is notified. Thereafter, the integrated identity management device 1b advances the process to operation S123.

In operation S119, when the search result management table includes a result record containing the determined attribute data set in the "search condition" field 2004 ("Yes" in operation S115), the table updater 22 determines whether the entity ID related to the presence update notification has been stored in the "hit ID" field 2010 of the corresponding result record. When the entity ID related to the presence update notification has been stored in the "hit ID" field 2010 of the corresponding result record ("Yes" in operation S119), the integrated identity management device 1b advances the process to operation S123.

In operation S121, when the entity ID related to the presence update notification has not been stored in the "hit ID" field 2010 in the corresponding result record ("No" in operation S119), the table updater 22 adds the entity ID related to the presence update notification in the "hit ID" field 2010 of the corresponding result record and increments the hit count stored in the "hit count" field 2006 by one. This operation is for adding, when a change has been occurred in the attribute value of a certain attribute, the entity ID to a result record related to the attribute data set after the change. Thereafter, the integrated identity management device 1b advances the process to operation S123.

In operation S123, the table updater 22 determines whether all the attribute data sets included in the presence update notification have been processed. When some of the attribute data sets included in the presence update notification have not been processed ("No" in operation S123), the integrated identity management device 1b returns the process to operation S113, and repeats the aforementioned operations. When all the attribute data set included in the presence update notification have been processed ("Yes" in operation S123), the integrated identity management device 1b terminates the process.

By performing the aforementioned operations, the search result management table may be appropriately updated in response to a presence update notification.

FIG. 23 to FIG. 28 illustrate an exemplary flowchart of an integrated identity management device according to an embodiment of the present invention. Operations in the integrated identity management device 1b according to the embodiment will be discussed with reference to FIG. 23 to FIG. 28.

Figure 23:
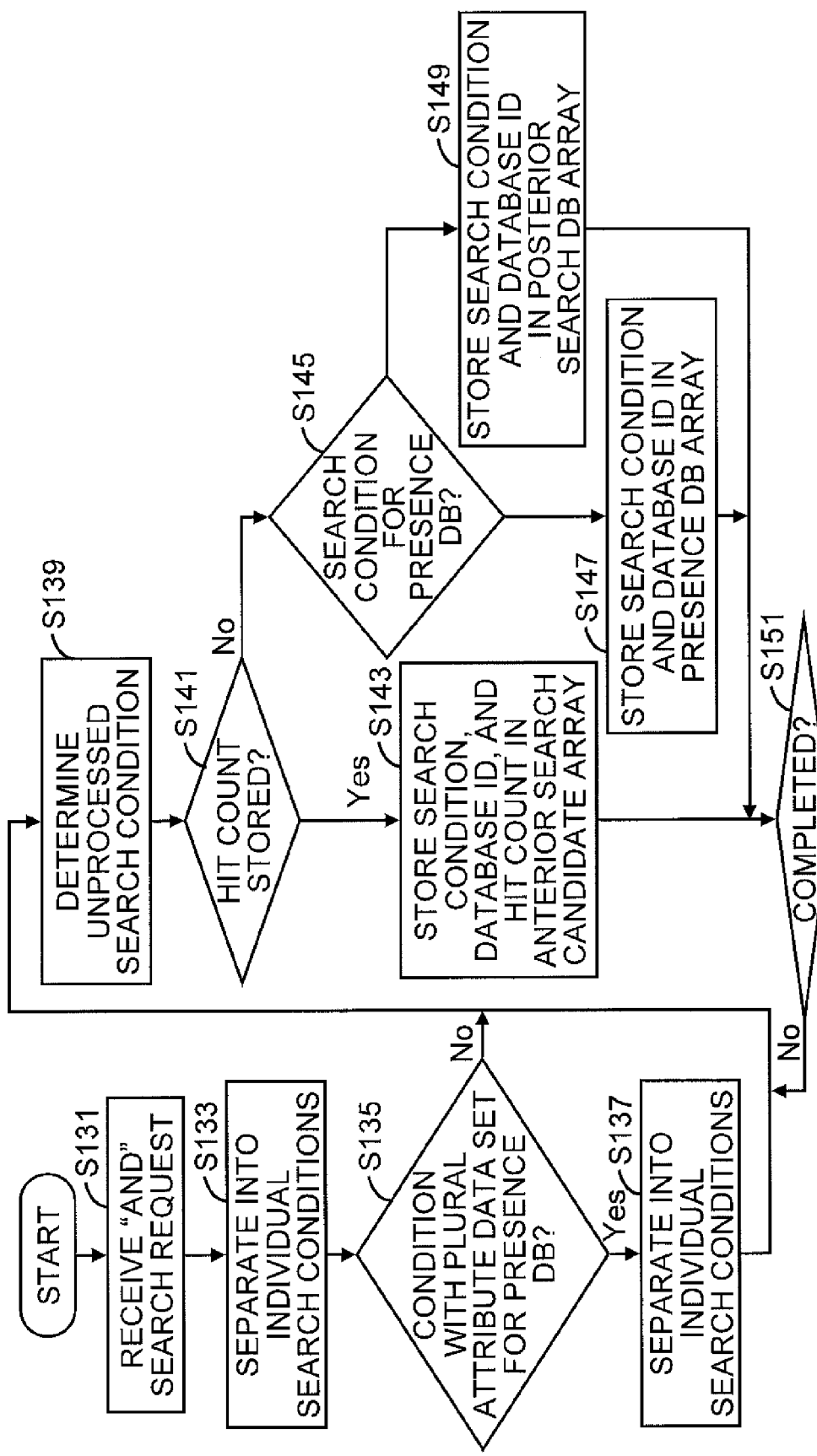
FIG. 23 is a diagram illustrating a part of an exemplary flowchart of an integrated identity management device according to an embodiment of the present invention.

In operation S131 in FIG. 23, the input unit 11 of the integrated identity management device 1b receives, from one of the clients, an "AND" search request including plural search conditions each of which contains an attribute data set, i.e., a combination of an attribute name and an attribute value. The input unit 11 outputs the "AND" search request to the condition separator 13.

In operation S133, upon receiving the "AND" search request from the input unit 11, the condition separator 13 separates the search conditions included in the "AND" search request into search conditions for individual databases in accordance with the attribute management table. The separated search conditions are temporarily stored in a condition storage, in association with the database ID of the corresponding searched database.

In operation S135, the condition separator 13 determines whether any of the search conditions derived in operation S133 are for a presence database and include plural attribute data sets.

In operation S137, when some of the search conditions derived in operation S133 are for a presence database and include plural attribute data sets ("Yes" in operation S135), the condition separator 13 separates each of the search conditions into search conditions for individual attributes. For example, when one of the search conditions derived in operation S133 is a search condition "(attribute_X=uuu) AND (attribute_Y=ooo)" for a presence database, the search condition may be separated into "attribute_X=uuu" and "attribute_Y=ooo" in operation S137.

When none of the search conditions derived in operation S133 is for a presence database or includes plural attribute data sets ("No" in operation S135), the integrated identity management device 1b skips operation S137 and advances the process to operation S139.

In operation S139, the condition separator 13 determines a search condition, which has not been processed, out of the separated search conditions.

In operation S141, the condition separator 13 determines whether the hit count corresponding to the determined search condition has been stored in the cache 14 or the search result management table.

In operation S143, when the hit count corresponding to the determined search condition has been stored in the cache 14 or the search result management table ("Yes" in operation S141), the condition separator 13 stores, in the anterior search candidate array stored in the array data storage 17, the determined search condition, the database ID of a corresponding searched database, and the hit count. Thereafter, the integrated identity management device 1b advances the process to operation S151.

In operation S145, when the hit count corresponding to the determined search condition has not been stored in the cache 14 or the search result management table ("No" in operation S141), the condition separator 13 determines whether the determined search condition is a search condition for a presence database.

In operation S147, when the determined search condition is a search condition for a presence database ("Yes" in operation S145), the condition separator 13 stores the determined search condition and the database ID of the presence database in a presence DB array stored in the array data storage 17. The presence DB array has a similar data configuration as illustrated in FIG. 7B. Thereafter, the integrated identity management device 1b advances the process to operation S151.

In operation S149, when the determined search condition is not a search condition for a presence database ("No" in operation S145), the condition separator 13 stores the determined search condition and the database ID of a corresponding searched database in the posterior search DB array stored in the array data storage 17.

When the search result management table has no result record containing the determined search condition, the condition separator 13 adds, to the search result management table, a new result record containing the determined search condition and the database ID of a corresponding searched database and sets the search count to zero. Thereafter, the integrated identity management device 1b advances the process to operation S151.

In operation S151, the condition separator 13 determines whether all the separated search conditions have been processed. When some of the separated search conditions have not been processed ("No" in operation S151), the integrated identity management device 1b returns the process to operation S139, and repeats the aforementioned operations. When all the separated search conditions have been processed ("Yes" in operation S151), the condition separator 13 notifies the anterior search DB determiner 16 that separation of the search conditions has been completed. Thereafter, the integrated identity management device 1b advances the process to operation S153 in FIG. 24.

Figure 24:
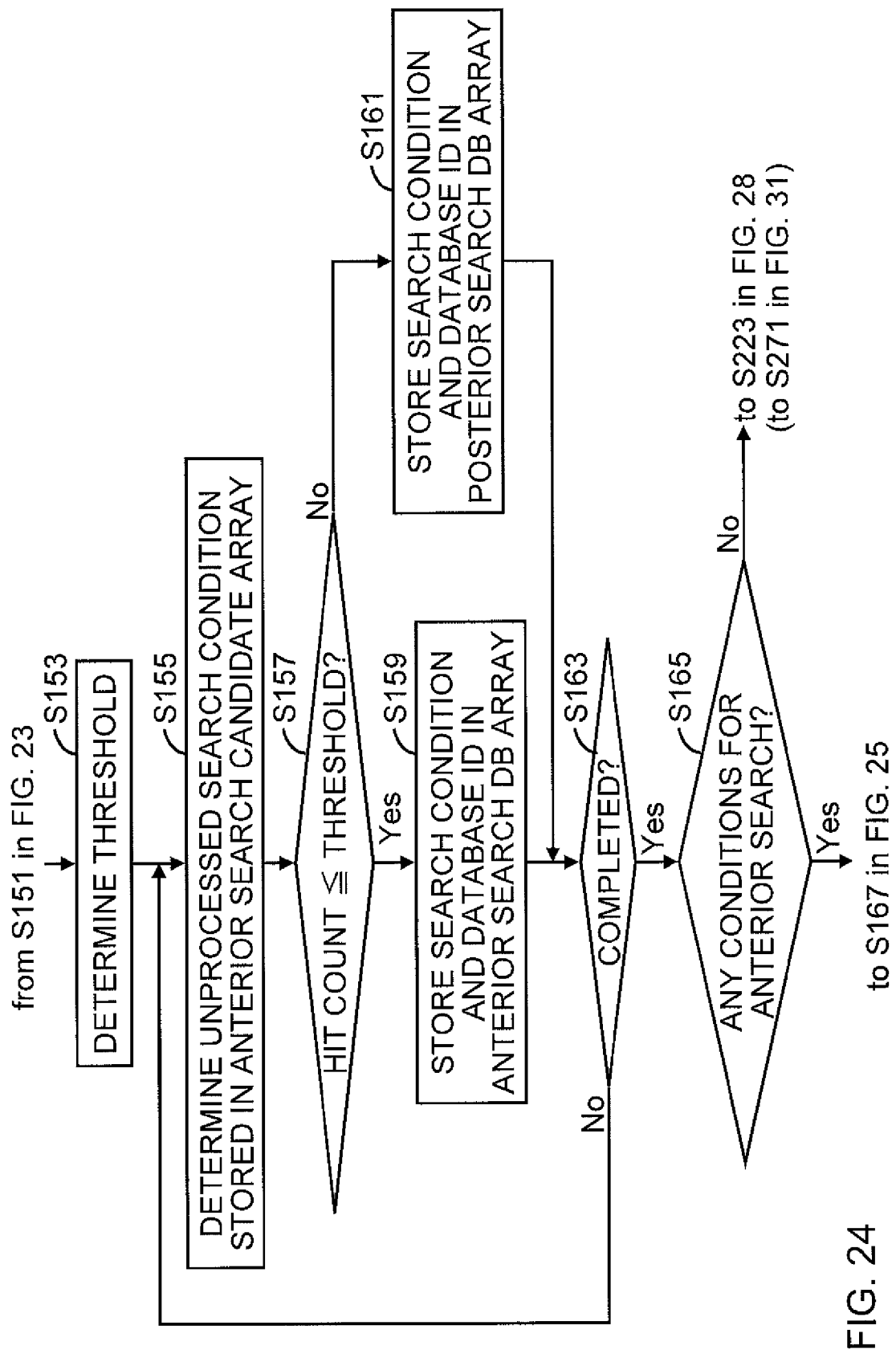
FIG. 24 is a diagram illustrating a part of an exemplary flowchart of an integrated identity management device according to an embodiment of the present invention.

In operation S153 in FIG. 24, upon receiving from the condition separator 13 the notification stating that separation of the search conditions has been completed, the anterior search DB determiner 16 determines a maximum value of the hit counts stored in the anterior search candidate array to determine an anterior search DB determination threshold on the basis of the determined maximum value.

In operation S155, the anterior search DB determiner 16 determines a search condition, that has not been processed, stored in the anterior search candidate array.

In operation S157, the anterior search DB determiner 16 determines whether the hit count corresponding to the determined search condition is less than or equal to the anterior search DB determination threshold.

In operation S159, when the hit count corresponding to the determined search condition is less than or equal to the anterior search DB determination threshold ("Yes" in operation S157), the anterior search DB determiner 16 stores the determined search condition and the database ID of a corresponding searched database in the anterior search DB array stored in the array data storage 17. Thereafter, the integrated identity management device 1b advances the process to operation S163.

In operation S161, when the hit count corresponding to the determined search condition exceeds the anterior search DB determination threshold ("No" in operation S157), the anterior search DB determiner 16 stores the determined search condition and the database ID of the corresponding searched database in the posterior search DB array stored in the array data storage 17. Thereafter, the integrated identity management device 1b advances the process to operation S163.

In operation S163, the anterior search DB determiner 16 determines whether all the search conditions stored in the anterior search candidate array have been processed. When some of the search conditions stored in the anterior search candidate array have not been processed ("No" in operation S163), the integrated identity management device 1b returns the process to operation S155, and repeats the aforementioned operations. When all the search conditions stored in the anterior search candidate array have been processed ("Yes" in operation S163), the anterior search DB determiner 16 outputs to the DB searcher 18 a notification stating that anterior search DB determination has been completed.

In operation S165, upon receiving from the anterior search DB determiner 16 the notification stating that anterior search DB determination has been completed, the DB searcher 18 determines whether any search conditions have been stored in the anterior search DB array. When no search condition has been stored in the anterior search DB array ("No" in operation S165), the integrated identity management device 1b advances the process to operation S223 in FIG. 28.

Figure 25:
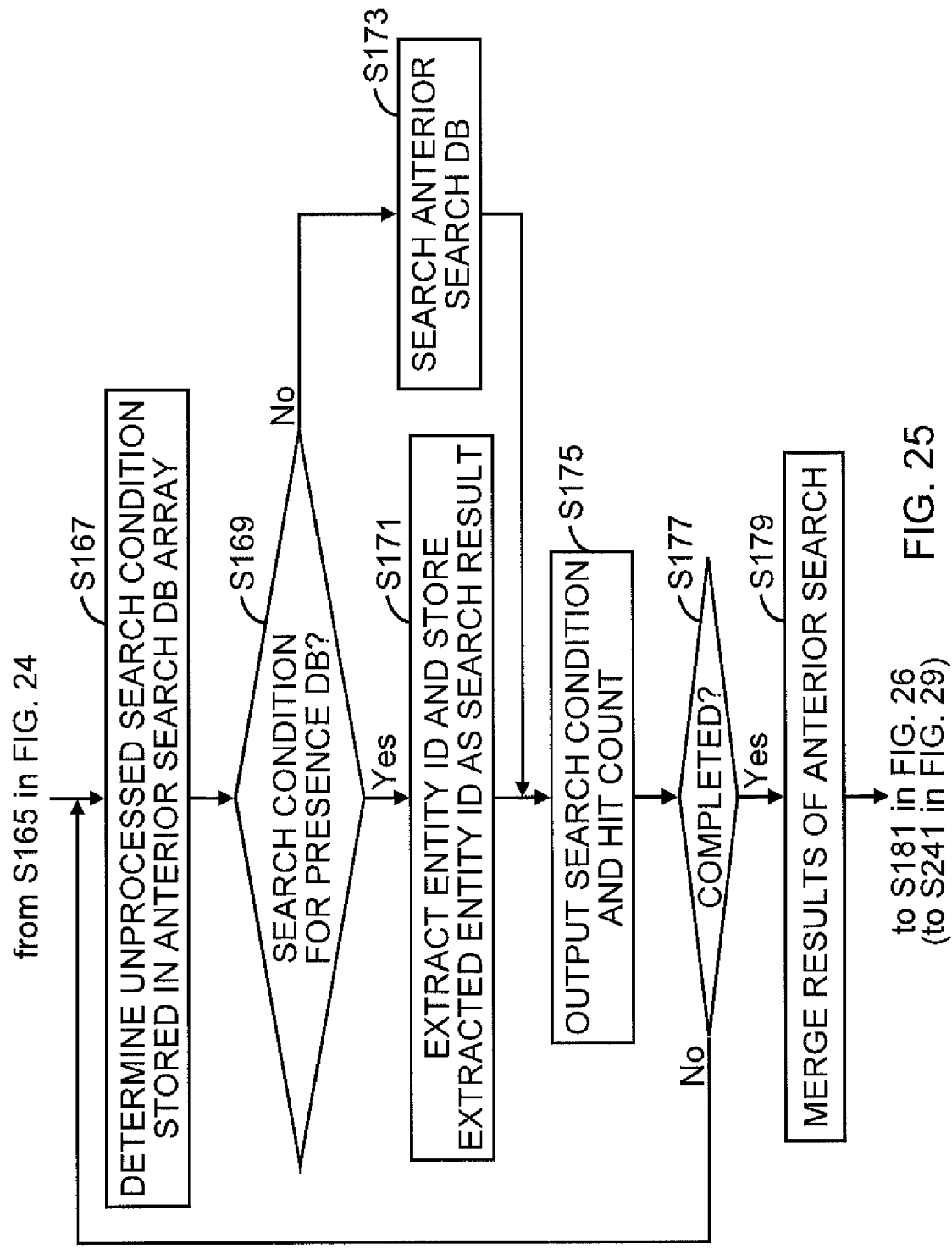
FIG. 25 is a diagram illustrating a part of an exemplary flowchart of an integrated identity management device according to an embodiment of the present invention.

When some search conditions have been stored in the anterior search DB array ("Yes" in operation S165), the integrated identity management device 1b advances the process to operation S167 in FIG. 25.

In operation S167 in FIG. 25, the DB searcher 18 determines a search condition, that has not been processed, stored in the anterior search DB array.

In operation S169, the DB searcher 18 determines whether the determined search condition is a search condition for a presence database.

In operation S171, when the determined search condition is a search condition for a presence database ("Yes" in operation S169), the DB searcher 18 determines a result record, stored in the cache 14 or the search result management table, containing the determined search condition. Then, the DB searcher 18 extracts entity IDs from the "hit ID" field 2010 of the determined result record, and stores the extracted entity IDs as a search result in the search result storage 20. At this time, the entity IDs are stored in association with the database ID of the presence database. Thereafter, the integrated identity management device 1b advances the process to operation S175.

In operation S173, when the determined search condition is not a search condition for a presence database ("No" in operation S169), the DB searcher 18 searches the anterior search database by the determined search condition. For example, the DB searcher 18 outputs a search request including the determined search condition to the anterior search database. Then, the DB searcher 18 stores a search result returned from the anterior search database in association with the database ID of the anterior search database in the search result storage 20. Thereafter, the integrated identity management device 1b advances the process to operation S175.

In operation S175, the DB searcher 18 outputs the determined search condition and the hit count included in the search result to the cache controller 19. When the determined search condition is a search condition for a presence database, the DB searcher 18 outputs, as a hit count, an amount of entity IDs extracted in operation S171 to the cache controller 19.

In operation S177, the DB searcher 18 determines whether all the search conditions stored in the anterior search DB array have been processed. When some of the search conditions stored in the anterior search DB array have not been processed ("No" in operation S177), the integrated identity management device 1b returns the process to operation S167, and repeats the aforementioned operations.

In operation S179, when all the search conditions stored in the anterior search DB array have been processed ("Yes" in operation S177), the DB searcher 18 merges, to obtain an anterior search result, the search results of anterior search, stored in the search result storage 20. That is, the DB searcher 18 determines entity IDs included in common in the search results of anterior search. Thereafter, the integrated identity management device 1b advances the process to operation S181 in FIG. 26.

Figure 26:
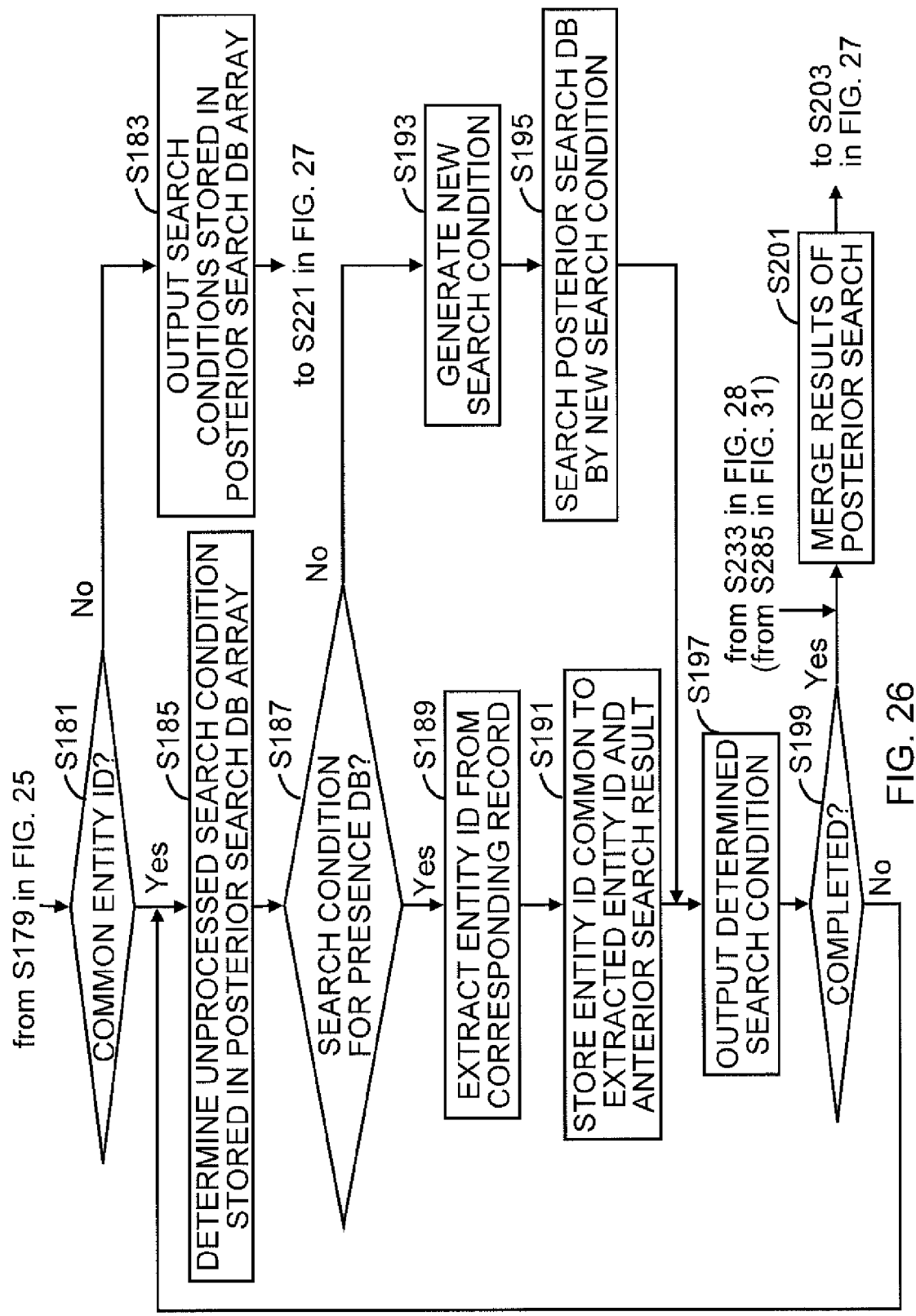
FIG. 26 is a diagram illustrating a part of an exemplary flowchart of an integrated identity management device according to an embodiment of the present invention.

In operation S181 in FIG. 26, the DB searcher 18 determines whether any entity. IDs are included in common in the search results of anterior search.

In operation S183, when no entity ID is included in common in the search results of anterior search ("No" in operation S181), the DB searcher 18 outputs the search conditions stored in the posterior search DB array to the cache controller 19. The search is terminated without searching any posterior search databases when no entity ID is included in common in the search results of anterior search. However, the search counts stored in the cache 14 and in the search result management table may be incremented by one, since each of the search conditions stored in the posterior search DB array has been specified in the search request. The DB searcher 18 requests the output unit 21 to output the search result stored in the search result storage 20. Thereafter, the integrated identity management device 1b advances the process to operation S221 in FIG. 27.

When some entity IDs are included in common in the search results of anterior search ("Yes" in operation S181), the DB searcher 18 starts to search posterior search databases.

In operation S185, the DB searcher 18 determines a search condition, that has not been processed, stored in the posterior search DB array.

In operation S187, the DB searcher 18 determines whether the determined search condition is a search condition for a presence database.

In operation S189, when the determined search condition is a search condition for a presence database ("Yes" in operation S187), the DB searcher 18 determines a result record, stored in the cache 14 or the search result management table, containing the determined search condition, and extracts entity IDs from the "hit ID" field 2010 of the determined result record.

In operation S191, the DB searcher 18 stores, in the search result storage 20, entity IDs included in common in the extracted entity IDs and in the entity IDs obtained in anterior search, as a search result. At this time, the entity IDs are stored in association with the database ID of the presence database. Thereafter, the integrated identity management device 1b advances the process to operation S197.

In operation S193, when the determined search condition is not a search condition for a presence database ("No" in operation S187), the DB searcher 18 generates a new search condition by adding the entity IDs obtained in anterior search to the determined search condition.

In operation S195, the DB searcher 18 searches a corresponding posterior search database by the generated new search condition. For example, the DB searcher 18 outputs a search request including the determined search condition and the entity IDs obtained in anterior search to the posterior search database. In this arrangement, the search range of posterior search databases other than a presence database may be narrowed down to an extent greater than that after anterior search. Then, the DB searcher 18 stores a search result returned from the posterior search database in association with the database ID of the posterior search database in the search result storage 20. Thereafter, the integrated identity management device 1b advances the process to operation S197.

In operation S197, the DB searcher 18 outputs the determined search condition to the cache controller 19. The hit count of the determined search condition stored in the cache 14 and in the search result management table may not be updated, since the search range of posterior search is narrowed down using the entity IDs obtained in anterior search. Thus, the DB searcher 18 does not output the hit count included in the search result to the cache controller 19 in operation S197.

In operation S199, the DB searcher 18 determines whether all the search conditions stored in the posterior search DB array have been processed. When some of the search conditions stored in the posterior search DB array have not been processed ("No" in operation S199), the integrated identity management device 1b returns the process to operation S185, and repeats the aforementioned operations.

In operation S201, when all the search conditions stored in the posterior search DB array have been processed ("Yes" in operation S199), the DB searcher 18 merges, to obtain a posterior search result, the search results of posterior search, stored in the search result storage 20. That is, the DB searcher 18 determines entity IDs included in common in the search results of posterior search. Thereafter, the integrated identity management device 1b advances the process to operation S203 in FIG. 27.

Figure 27:
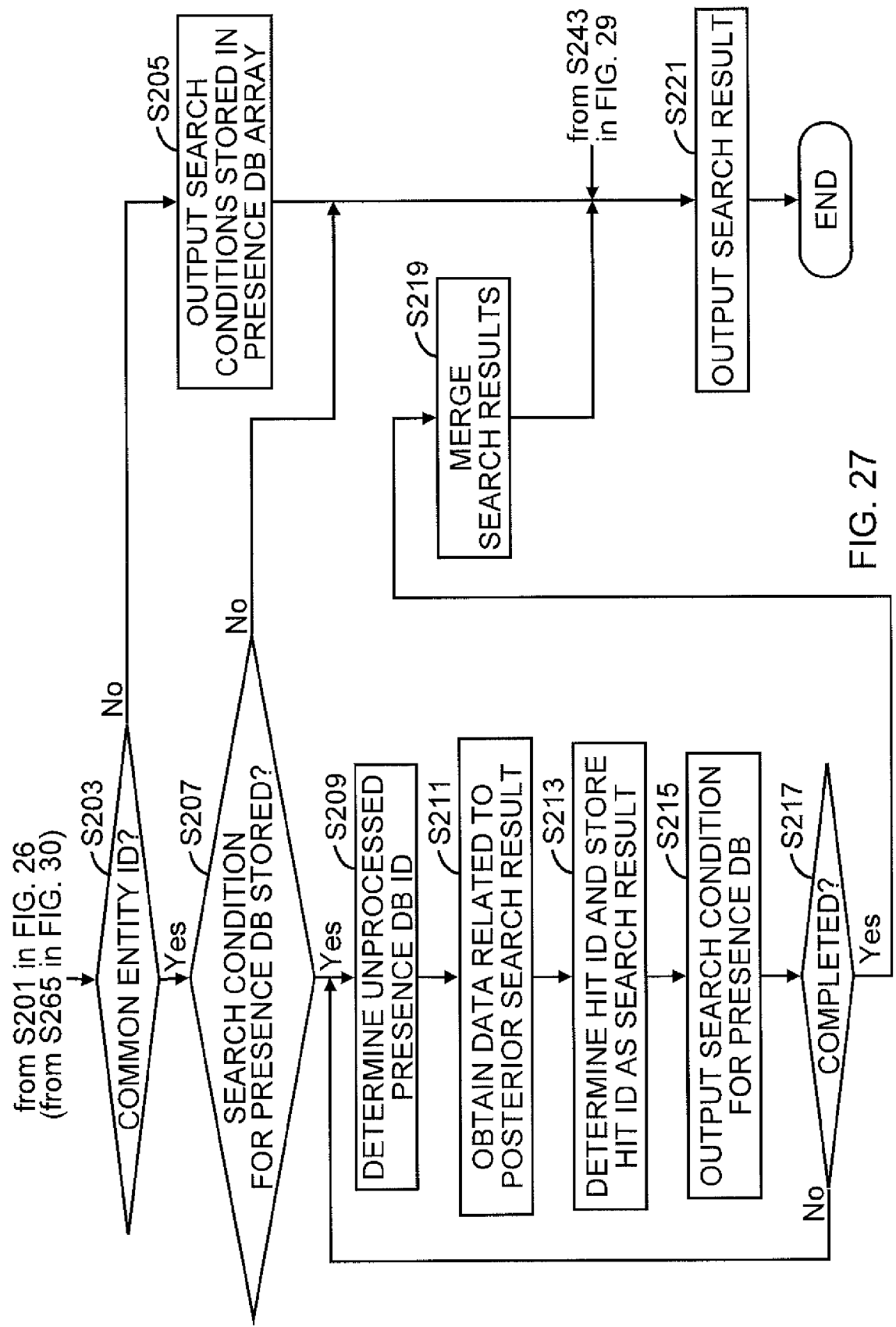
FIG. 27 is a diagram illustrating a part of an exemplary flowchart of an integrated identity management device according to an embodiment of the present invention.

In operation S203 in FIG. 27, the DB searcher 18 determines whether any entity IDs are included in common in the search results of posterior search.

In operation S205, when no entity ID is included in common in the search results of posterior search ("No" in operation S203), the DB searcher 18 outputs the search conditions stored in the presence DB array to the cache controller 19. The search is terminated when no entity ID is included in common in the search results of posterior search. However, the search count stored in the cache 14 and in the search result management table may be incremented by one regarding each of the search conditions stored in the presence DB array. Then, the DB searcher 18 requests the output unit 21 to output the search result. Thereafter, the integrated identity management device 1b advances the process to operation S221.

In operation S207, when some entity IDs are included in common in the search results of posterior search ("Yes" in operation S203), the DB searcher 18 determines whether any search conditions have been stored in the presence DB array. When no search condition has been stored in the presence DB array ("No" in operation S207), the DB searcher 18 requests the output unit 21 to output the search result. Thereafter, the integrated identity management device 1b advances the process to operation S221.

In operation S209, when some search conditions have been stored in the presence DB array ("Yes" in operation S207), the DB searcher 18 determines a database ID, that has not been processed, stored in the presence DB array.

In operation S211, the DB searcher 18 obtains, from a presence database identified with the determined database ID, data related to the entity IDs obtained in posterior search and temporarily stores the obtained data in a storage.

In operation S213, the DB searcher 18 determines, in accordance with the obtained data, entity IDs such that the attribute value managed in association with the entity IDs in the presence database satisfy the search condition for the presence database identified with the determined database ID and stores, in the search result storage 20, the determined entity IDs as a search result. At this time, the entity IDs are stored in association with the database ID of the presence database.

In operation S215, the DB searcher 18 outputs, to the cache controller 19, the search condition for the presence database identified with the determined database ID. The hit count may not be updated, since the search range is narrowed down using the entity IDs obtained in posterior search.

In operation S217, the DB searcher 18 determines whether all the database IDs stored in the presence DB array have been processed. When some of the database IDs stored in the presence DB array have not been processed ("No" in operation S217), the integrated identity management device 1b returns the process to operation S209, and repeats the aforementioned operations.

In operation S219, when all the database IDs stored in the presence DB array have been processed ("Yes" in operation S217), the DB searcher 18 merges the search results, stored in the search result storage 20, for the presence databases to obtain a final search result. Then, the DB searcher 18 requests the output unit 21 to output the final search result.

In operation S221, the output unit 21 outputs, in response to the request from the DB searcher 18, the search result stored in the search result storage 20 to the client which has issued the "AND" search request. Thereafter, the integrated identity management device 1b terminates the process.

Figure 28:
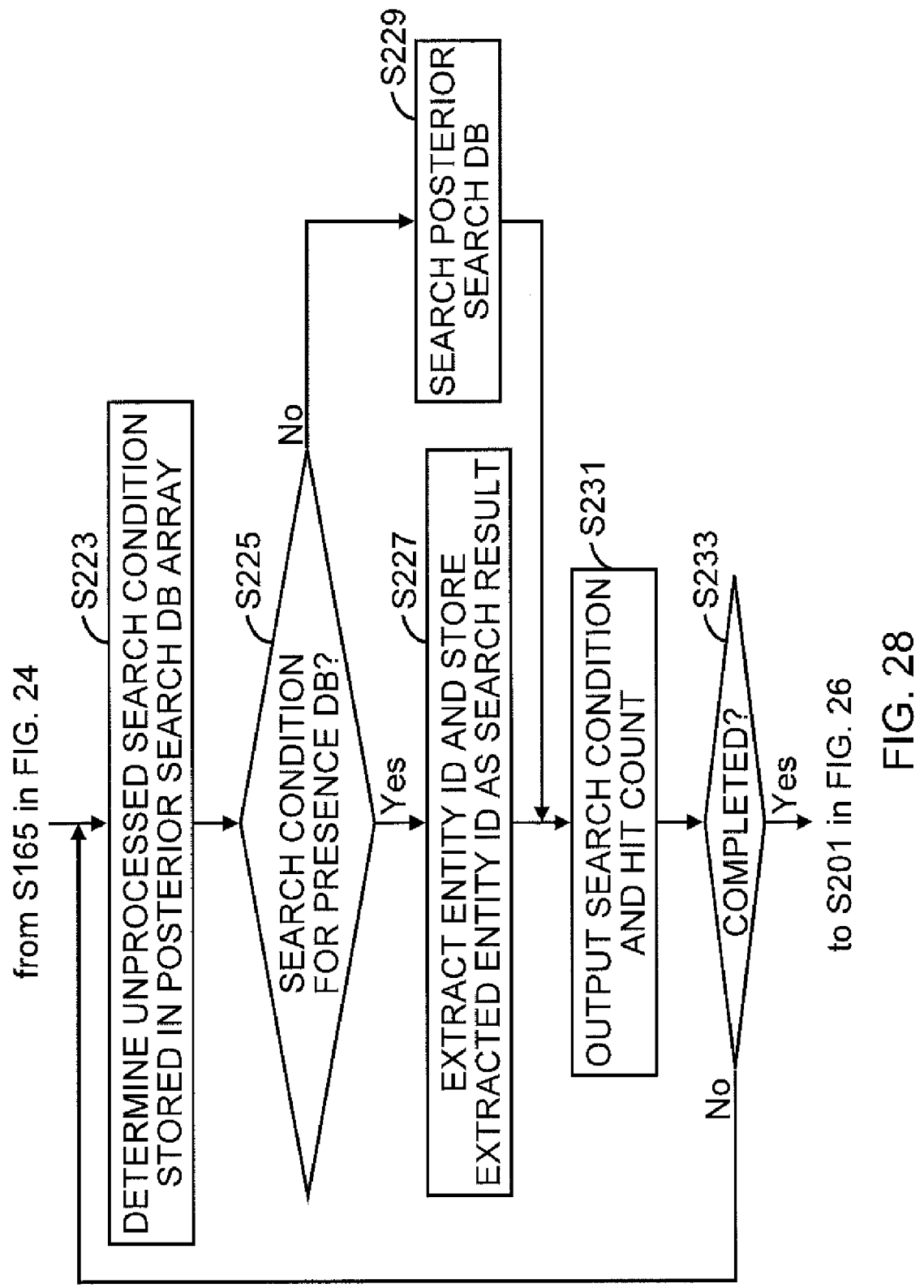
FIG. 28 is a diagram illustrating a part of an exemplary flowchart of an integrated identity management device according to an embodiment of the present invention.

In operation S223 in FIG. 28, when no search condition has been stored in the anterior search DB array ("No" in operation S165 in FIG. 24), the DB searcher 18 determines a search condition, that has not been processed, stored in the posterior search DB array.

In operation S225, the DB searcher 18 determines whether the determined search condition is a search condition for a presence database.

In operation S227, when the determined search condition is a search condition for a presence database ("Yes" in operation S225), the DB searcher 18 determines a result record, stored in the cache 14 or the search result management table, containing the determined search condition. Then, the DB searcher 18 extracts entity IDs from the "hit ID" field 2010 in the determined result record, and stores the extracted entity IDs as a search result in the search result storage 20. At this time, the entity IDs are stored in association with the database ID of the presence database. Thereafter, the integrated identity management device 1b advances the process to operation S231.

In operation S229, when the determined search condition is not a search condition for a presence database ("No" in operation S225), the DB searcher 18 searches a posterior search database, by the determined search condition. For example, the DB searcher 18 outputs a search request including the determined search condition to the posterior search database. Then, the DB searcher 18 stores a search result returned from the posterior search database in association with the database ID of the posterior search database in the search result storage 20. Thereafter, the integrated identity management device 1b advances the process to operation S231.

In operation S231, the DB searcher 18 outputs the determined search condition and the hit count included in the search result to the cache controller 19. That is, the cache controller 19 is caused to update the cache 14 and the search result management table.

In operation S233, the DB searcher 18 determines whether all the search conditions stored in the posterior search DB array have been processed. When some of the search conditions stored in the posterior search DB array have not been processed ("No" in operation S233), the integrated identity management device 1b returns the process to operation S223, and repeats the aforementioned operations. When all the search conditions stored in the posterior search DB array have been processed ("Yes" in operation S233), the integrated identity management device 1b advances the process to operation S201 in FIG. 26. After the operations in operation S201 to operation S221 are performed, the integrated identity management device 1b terminates the process.

By performing the aforementioned operations cross search across plural databases may be efficiently performed even when some databases, such as presence databases, do not have search function.

Third Embodiment

In the second embodiment discussed above, presence databases and databases other than presence databases are processed in parallel in posterior search, and the search results are merged. In contrast, in the third embodiment, when the posterior search DB array includes some records (referred to as posterior search records) for presence databases, entity IDs contained in posterior search records that satisfy search conditions for the presence databases are extracted from the search result management table. Then, posterior search databases other than the presence databases are searched by a search condition added with the extracted entity IDs. That is, the search ranges of the posterior search databases other than the presence databases are narrowed down to a greater extent using the extracted entity IDs.

Figure 29:
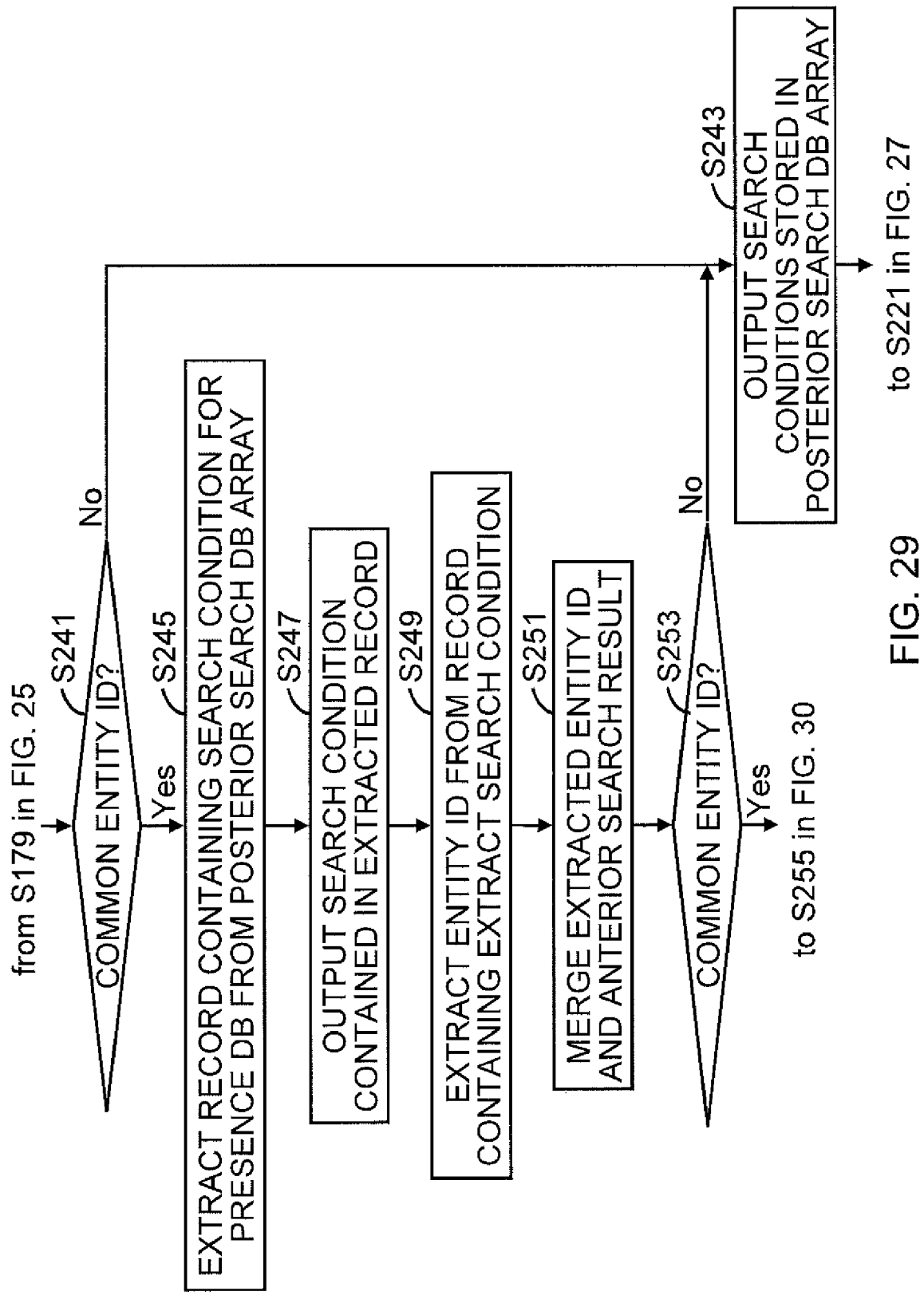
FIG. 29 is a diagram illustrating a part of an exemplary flowchart of an integrated identity management device according to an embodiment of the present invention.
Figure 30:
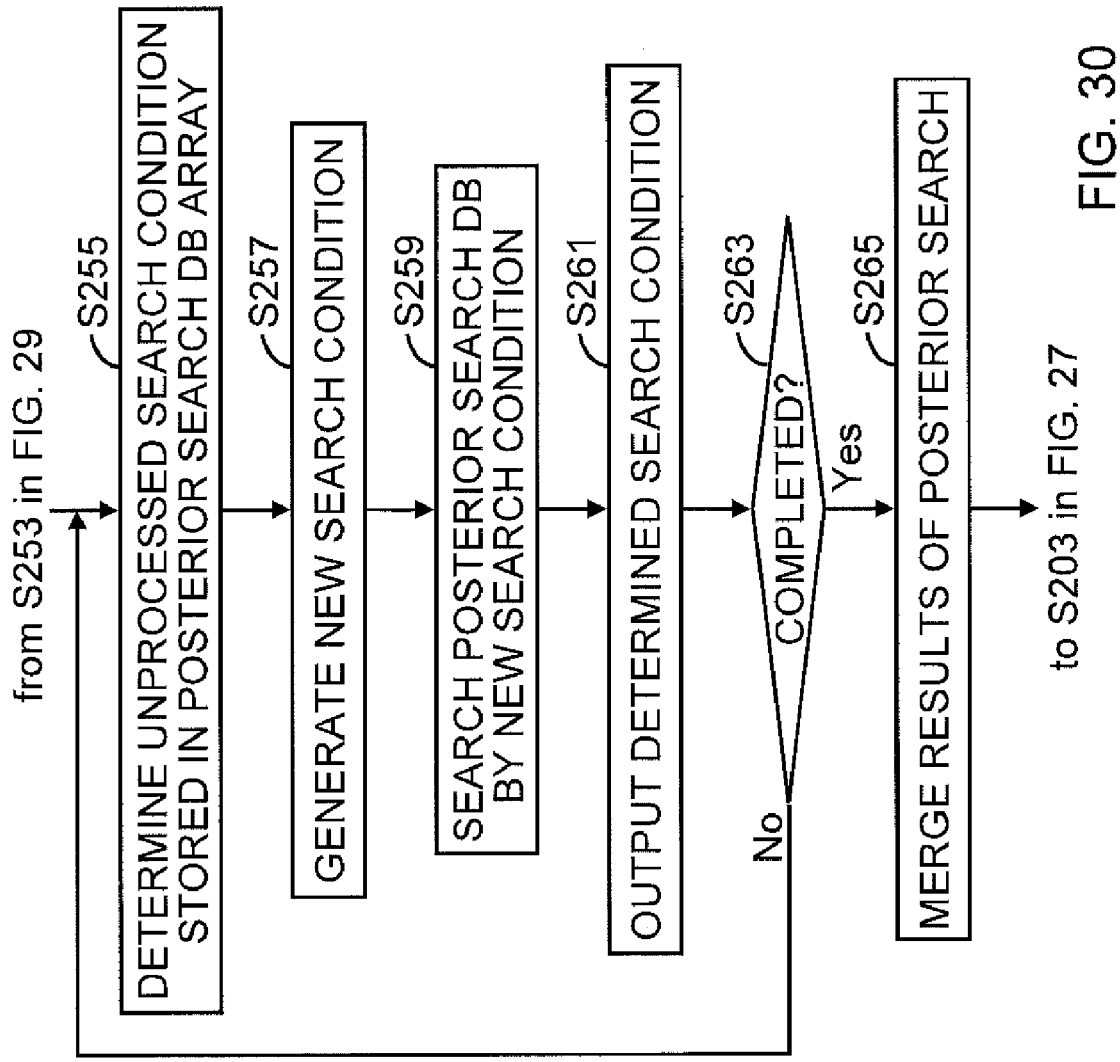
FIG. 30 is a diagram illustrating a part of an exemplary flowchart of an integrated identity management device according to an embodiment of the present invention.
Figure 31:
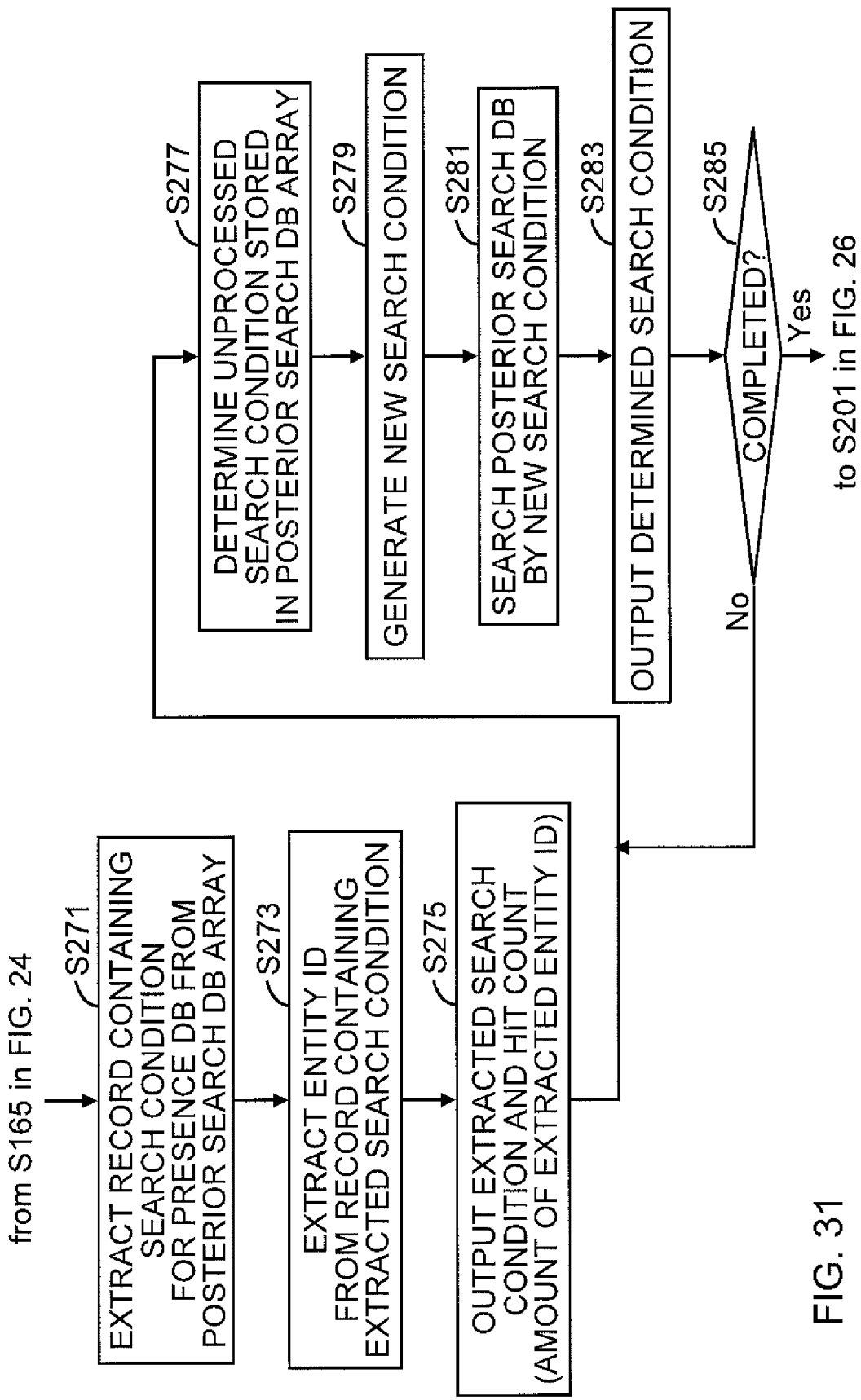
FIG. 31 is a diagram illustrating a part of an exemplary flowchart of an integrated identity management device according to an embodiment of the present invention.

It is assumed that the integrated identity management system and the integrated identity management device according to the third embodiment have similar configurations as those of the second embodiment. FIG. 29 to FIG. 31 illustrate an exemplary flowchart of an integrated identity management device according to an embodiment of the present invention. The operation flow of the integrated identity management device 1b in the third embodiment is similar as that of the second embodiment except that operations in FIG. 26 are replaced with operations in FIG. 29 and FIG. 30 and operations in FIG. 28 are replaced with operations in FIG. 31. These operations will be discussed below.

The operation flow illustrated in FIG. 29 and FIG. 30 will first be discussed. In this case, it is assumed that, operation S131 in FIG. 23 to operation S179 in FIG. 25, discussed in the second embodiment, have been performed.

In operation S241 in FIG. 29, the DB searcher 18 determines whether any entity IDs are included in common in the search results of anterior search.

In operation S243, when no entity ID is included in common in the search results of anterior search ("No" in operation S241), the DB searcher 18 outputs the search conditions stored in the posterior search DB array to the cache controller 19. The search is terminated without searching any posterior search databases when no entity ID is included in common in the search results of anterior search. However, the search counts stored in the cache 14 and in the search result management table may be incremented by one, since each of the search conditions stored in the posterior search DB array has been specified in the search request. The DB searcher 18 requests the output unit 21 to output the search result. Thereafter; the integrated identity management device 1b advances the process to operation S221 in FIG. 27.

In operation S245, when some entity IDs are included in common in the search results of anterior search ("Yes" in operation S241), the DB searcher 18 extracts, from the posterior search DB array, posterior search records containing a search condition for a presence database. At this time, the posterior search records containing a search condition for a presence database are deleted from the posterior search DB array. When the posterior search DB array include plural posterior search records containing a search condition for a presence database, all the posterior search records may be extracted.

In operation S247, the DB searcher 18 outputs the search conditions contained in the extracted posterior search records to the cache controller 19. That is, the cache controller 19 is caused to increment the search count by one regarding the search conditions contained in the extracted posterior search records.

In operation S249, the DB searcher 18 determines result records, stored in the cache 14 or the search result management table, containing the search conditions and extracts entity IDs from the "hit ID" field 2010 in the determined result records. When plural result records are extracted in operation S245, an entity ID may be extracted for each of the search conditions contained in the extracted result records.

In operation S251, the DB searcher 18 merges the extracted entity IDs and the entity IDs obtained in anterior search. That is, the DB searcher 18 determines entity IDs included in common in the extracted entity IDs and the entity IDs obtained in anterior search.

In operation S253, the DB searcher 18 determines whether any entity IDs (referred to as a common entity ID) are included in common in the entity IDs and the entity IDs obtained in anterior search. When no common ID is included in common in the entity IDs and the entity IDs obtained in anterior search ("No" in operation S253), the integrated identity management device 1b advances the process to operation S243.

When some common IDs are included in common in the entity IDs and the entity IDs obtained in anterior search ("Yes" in operation S253), the integrated identity management device 1b advances the process to operation S255 in FIG. 30.

In operation S255 in FIG. 30, the DB searcher 18 determines a search condition, that has not been processed, stored in the posterior search DB array. At this point of time, search conditions stored in the posterior search DB array include only search conditions for databases other than a presence database.

In operation S257, the DB searcher 18 generates a new search condition by adding the common entity IDs to the determined search condition.

In operation S259, the DB searcher 18 searches a corresponding posterior search database by the generated new search condition. For example, the DB searcher 18 outputs a search request including the determined search condition, the entity IDs obtained in anterior search, and the common entity ID to the posterior search database. That is, the search ranges of the posterior search databases are narrowed down, using the common entity ID, to an extent greater than in the second embodiment. Then, the DB searcher 18 stores a search result returned from the posterior search database in association with the database ID of the posterior search database in the search result storage 20.

In operation S261, the DB searcher 18 outputs the determined search condition to the cache controller 19. The hit count of the determined search condition stored in the cache 14 and in the search result management table may not be updated, since the search range of posterior search is narrowed down using the common entity ID and the entity IDs obtained in anterior search.

In operation S263, the DB searcher 18 determines whether all the search conditions stored in the posterior search DB array have been processed. When some of the search conditions stored in the posterior search DB array have not been processed ("No" in operation S263), the integrated identity management device 1b returns the process to operation S255, and repeats the aforementioned operations.

In operation S265, when all the search conditions stored in the posterior search DB array have been processed ("Yes" in operation S263), the DB searcher 18 merges the search results, stored in the search result storage 20, of posterior search to obtain a posterior search result. Thereafter, the integrated identity management device 1b advances the process to operation S203 in FIG. 27. Since operations in operation S203 and the following operations are similar to those discussed in the second embodiment, the description is omitted here.

The operation flow illustrated in FIG. 31 will be discussed. In this case, it is assumed that the DB searcher 18 has determined, in operation S165 in FIG. 24 discussed in the second embodiment, that no search condition has been stored in the anterior search DB array ("No" in operation S165).

In operation S271 in FIG. 31, the DB searcher 18 extracts, from the posterior search DB array, posterior search records containing a search condition for a presence database. At this time, the posterior search records containing a search condition for the presence DB are deleted from the posterior search DB array. When the posterior search DB array include plural posterior search records containing a search condition for a presence database, all the posterior search records may be extracted.

In operation S273, the DB searcher 18 determines result records, stored in the cache 14 or the search result management table, containing the extracted search condition and extracts entity IDs from the "hit ID" field 2010 in the determined result records. When plural result records are extracted in operation 5271, an entity ID may be extracted for each of the search conditions contained in the extracted result records.

In operation S275, the DB searcher 18 outputs an amount of the extracted entity IDs as the hit count, together with the search condition, to the cache controller 19. That is, the cache controller 19 is caused to update the search count and the hit count stored in the cache 14 and in the search result management table.

In operation S277, the DB searcher 18 determines a search condition, that has not been processed, stored in the posterior search DB array. At this point of time, search conditions stored in the posterior search DB array include only search conditions for databases other than a presence database.

In operation S279, the DB searcher 18 generates a new search condition by adding the entity IDs extracted in operation S273 to the determined search condition.

In operation S281, the DB searcher 18 searches a corresponding posterior search database, by the generated new search condition. For example, the DB searcher 18 outputs a search request including the determined search condition and the entity IDs extracted in operation S273 to the posterior search database. That is, even when posterior search is performed without performing anterior search, the search ranges of the posterior search databases other than a presence database are narrowed down using the entity IDs such that the attribute value managed in association with the entity IDs in the presence database satisfies the search conditions for the presence databases. Then, the DB searcher 18 stores a search result returned from the posterior search database in association with the database ID of the posterior search database in the search result storage 20.

In operation S283, the DB searcher 18 outputs the determined search condition to the cache controller 19. The hit count of the determined search condition stored in the cache 14 and in the search result management table may not be updated, since the search range of posterior search is narrowed down using the entity IDs such that the attribute value managed in association with the entity IDs in the presence database satisfies the search conditions for the presence databases.

In operation S285, the DB searcher 18 determines whether all the search conditions stored in the posterior search DB array have been processed. When some of the search conditions stored in the posterior search DB array have not been processed ("No" in operation S285), the integrated identity management device 1b returns the process to operation S277, and repeats the aforementioned operations.

When all the search conditions stored in the posterior search DB array have been processed ("Yes" in operation S285), the integrated identity management device 1b advances the process to operation S201 in FIG. 26. Since operations in operation S201 and the following operations are similar to those discussed in the second embodiment, the description is omitted here.

By performing the aforementioned process, the search range of the posterior search databases other than a presence database may be narrowed down to a greater extent using entity IDs such that the attribute value managed in association with the entity IDs in the presence database satisfies the search conditions for the presence databases.

While the embodiments of the present technique have been discussed, the present technique is not limited to the embodiments. For example, the respective functional block diagrams of the integrated identity management devices 1 and 1b discussed above may not necessarily reflect an actual system configuration. The functions of the integrated identity management devices 1 and 1b may be realized as software, and program module configuration may not be the same as the system configuration illustrated in the respective functional block diagrams of the integrated identity management devices 1 and 1b.

The data configuration of the tables and arrays discussed above are examples and the aforementioned data configuration are not necessarily mandatory. In the operation flows, the order of the operations may be changed or the operations may be performed in parallel, as long as the results do not change.

Individual entity IDs may be converted in accordance with predetermined rules, and data may be managed using the converted entity IDs in a certain database. In this case, in the integrated identity management devices 1 and 1b, operations may be performed, considering both an entity ID having not been converted and a corresponding entity ID having been converted indicates the same entity.

Programs for implementing, in combination with hardware, the integrated identity management devices 1 and 1b may be created. The programs may be stored in a storage medium or a storage device, for example, a flexible disk, a CD-ROM, a magneto-optical disk, a semiconductor memory, or a hard disk. Intermediate processing results are temporarily stored in a storage device such as a main memory.

Figure 32:
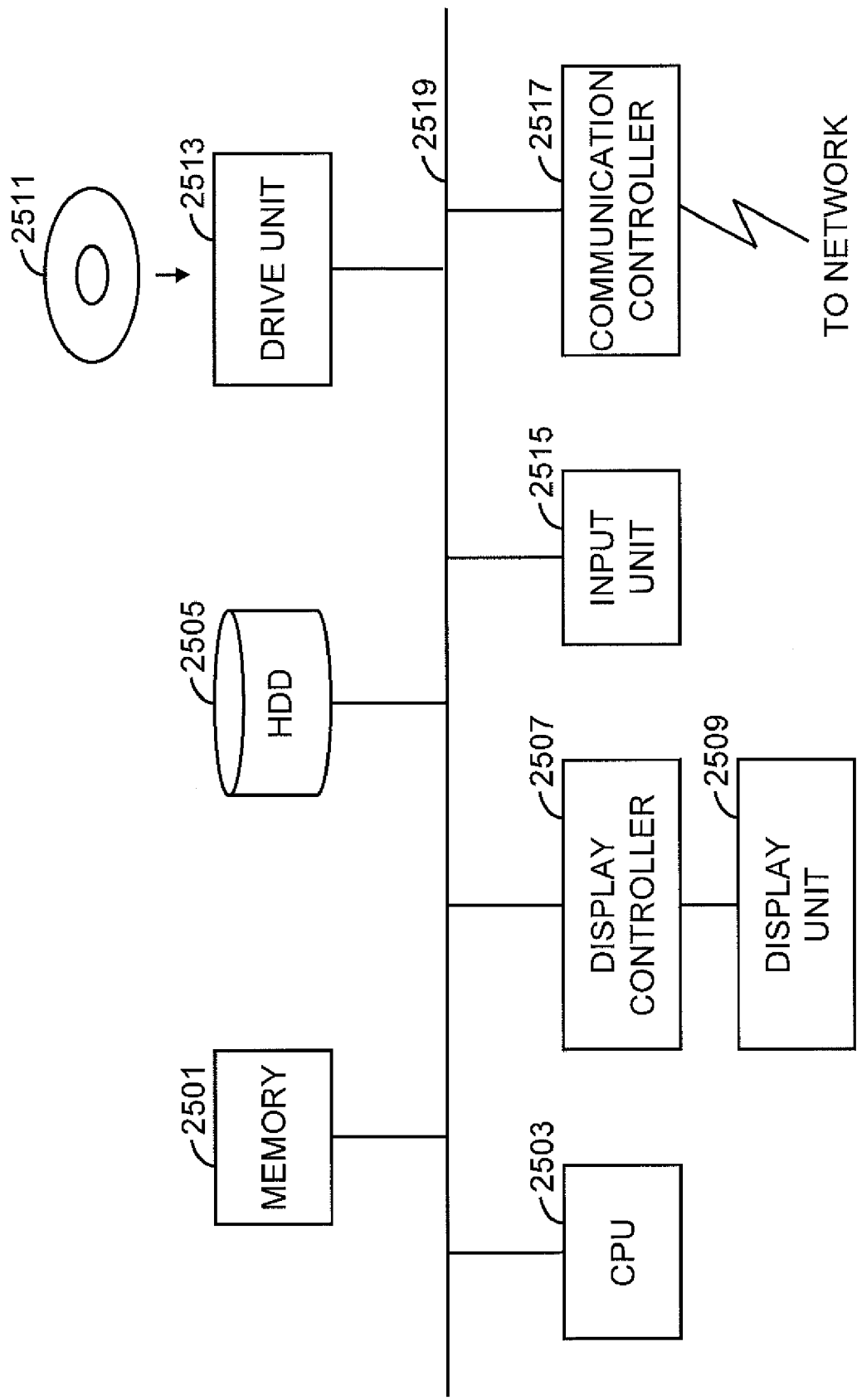
FIG. 32 is a block diagram illustrating an example of a system configuration of a computer.

The functions of the integrated identity management devices 1 and 1b may be realized as software executed by a computer. FIG. 32 is a block diagram illustrating an example of a system configuration of a computer. The computer illustrated in FIG. 32 includes a memory 2501 (a temporal storage), a central processing unit (CPU) 2503, a hard disk drive (HDD) 2505, a display controller 2507 connected to a display unit 2509, a drive unit 2513 for a removable disk 2511, an input unit 2515, and a communication controller 2517 that establishes a connection to a network. These components are connected to each other via a bus 2519. Operating system (OS) and application programs including a Web browser are stored in the HDD 2505 and are loaded from the HDD 2505 into the memory 2501 when executed by the CPU 2503. The CPU 2503 controls the display controller 2507, the communication controller 2517, and the drive unit 2513 so as to cause these components to perform appropriate operations as necessary. Data in process is stored in the memory 2501 and is stored, as necessary, in the HDD 2505. In such a computer, hardware, such as the CPU 2503 and the memory 2501, and software, such as the OS and necessary application programs, organically cooperate with each other to implement the aforementioned various functions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program to cause a computer to execute a search method, the search method comprising:
   providing plural databases sharing management of plural attributes associated with an entity identifier capable of identifying an entity, each of the plural databases storing an entity identifier in association with an attribute value of one of the plural attributes and an attribute name;
   receiving a search request including plural search conditions, each of the plural search conditions containing a combination of an attribute name and an attribute value;
   separating the plural search conditions included in the search request into search conditions for individual databases in accordance with an attribute management table, the attribute management table having attribute records containing a database identifier capable of identifying one of the plural databases and an attribute name of an attribute managed in the one of the plural databases;
   storing, for each database, the search condition and the database identifier in a condition record stored in a condition storage;
   searching a search result management table by the database identifier and the search condition contained in each of the condition records, the search result management table having result records containing a database identifier of a search database, a first search condition, and a hit count representing an amount of entity identifiers found in a past search, the attribute value managed in association with the entity identifiers in the search database satisfying the first search condition;
   determining anterior search databases identified with the database identifiers contained in the result records, the result records containing a hit count which is less than or equal to a predetermined amount or a hit count within a predetermined lowest ranks;
   searching each of the anterior search databases by the search condition contained in the condition record containing the database identifier of the each of the anterior search databases to acquire a first search result including a first entity identifier, the attribute value managed in association with the first entity identifier in the each of the anterior search databases satisfying the search condition for the each of the anterior search databases;
   determining common entity identifiers included in common in the first search results and
   generating a new search condition by adding an entity identifier determined to be in common and searching each of posterior search databases to acquire a second search result including second entity identifiers, and
   where the posterior search database being out of the plural databases other than the anterior search databases, the attribute value managed in association with the second entity identifier in the each of the posterior search databases satisfies the search condition for the each of the posterior search database.

2. The computer-readable recording medium of claim 1, the search method further including:
   determining whether any common entity identifiers have been found upon executing the determining common entity identifiers, and
   terminating without searching the posterior search databases when no common entity identifiers have been found.

3. The computer-readable recording medium of claim 1, wherein
   the result record further contains a third entity identifier notified from a presence system when a database out of the plural databases is a presence database managed by the presence system, the attribute value managed in association with the third entity identifier in the presence database satisfying the search condition containing a combination of an attribute name of an attribute managed in the presence database and an attribute value, and
   the searching each of the anterior search databases includes:
   acquiring as the first search result the third entity identifier contained in the result record for a presence database when the anterior search database is the presence database.

4. The computer-readable recording medium of claim 3, wherein
   the searching each of the posterior search databases includes:
   extracting fourth entity identifiers stored in the presence databases from result records when the posterior search databases include the presence databases, and
   searching each of the posterior search databases other than the presence databases by the search condition contained in the condition record, the common entity identifiers, and the fourth entity identifiers.

5. The computer-readable recording medium of claim 3, the search method further including:
   updating, upon receiving from the presence system a presence update notification including a second search condition and a fifth entity identifier, the search result management table in accordance with the presence update notification, the attribute value managed in association with the fifth entity identifier in the presence database satisfying the second search condition for the presence database.

6. The computer-readable recording medium of claim 1, the search method further including:
   storing, upon searching each of the anterior search databases, in a result record the hit count of the search in the each of the anterior search databases, the result record containing the database identifier of the each of the anterior search databases and the search condition for the each of the anterior search databases.

7. The computer-readable recording medium of claim 1, wherein the determining anterior search databases includes:
   determining a maximum value of the hit counts contained in the result records containing the database identifier and the search condition contained in the condition records,
   determining the predetermined amount on the basis of the maximum value.

8. The computer-readable recording medium of claim 1, wherein the result record further contains a search count representing a total count of past searches regarding the first search condition contained in the result record, the search method further including:

incrementing the search count contained in the result record by one upon searching the database identified with the database identifier contained in the result record by the first search condition contained in the result record, and storing in cache memory the result record containing a search count greater than a predetermined count, wherein the determining anterior search databases includes:

determining anterior search databases identified with the database identifiers contained in the result records stored in the cache memory.

9. A search device, the search device comprising:
a memory to store a program; and
a processor to execute a process based on the program, the process including:

providing plural databases sharing management of plural attributes associated with an entity identifier capable of identifying an entity, each of the plural databases storing an entity identifier in association with an attribute value of one of the plural attributes and an attribute name;

receiving a search request including plural search conditions, each of the plural search conditions containing a combination of an attribute name and an attribute value;

separating the plural search conditions included in the search request into search conditions for individual databases in accordance with an attribute management table, the attribute management table having attribute records containing a database identifier capable of identifying one of the plural databases and an attribute name of an attribute managed in the one of the plural databases;

storing, for each database, the search condition and the database identifier in a condition record stored in a condition storage;

searching a search result management table by the database identifier and the search condition contained in each of the condition records, the search result management table having result records containing a database identifier of a search database, a first search condition, and a hit count representing an amount of entity identifiers found in a past search, the attribute value managed in association with the entity identifiers in the search database satisfying the first search condition;

determining anterior search databases identified with the database identifiers contained in the result records, the result records containing a hit count which is less than or equal to a predetermined amount or a hit count within a predetermined lowest ranks;

searching each of the anterior search databases by the search condition contained in the condition record containing the database identifier of the each of the anterior search databases to acquire a first search result including a first entity identifier, the attribute value managed in association with the first entity identifier in the each of the anterior search databases satisfying the search condition for the each of the anterior search databases;

determining common entity identifiers included in common in the first search results; and generating a new search condition by adding an entity identifier determined to be in common and searching each of posterior search databases to acquire a second search result including second entity identifiers, and where the posterior search database being out of the plural databases other than the anterior search databases, the attribute value managed in association with the second entity identifier in the each of the posterior search databases satisfies the search condition for the each of the posterior search database.

10. A search method executed by a search device, the search method comprising:

providing plural databases sharing management of plural attributes associated with an entity identifier capable of identifying an entity, each of the plural databases storing an entity identifier in association with an attribute value of one of the plural attributes and an attribute name;

receiving a search request including plural search conditions, each of the plural search conditions containing a combination of an attribute name and an attribute value;

separating the plural search conditions included in the search request into search conditions for individual databases in accordance with an attribute management table, the attribute management table having attribute records containing a database identifier capable of identifying one of the plural databases and an attribute name of an attribute managed in the one of the plural databases;

storing, for each database, the search condition and the database identifier in a condition record stored in a condition storage;

searching a search result management table by the database identifier and the search condition contained in each of the condition records, the search result management table having result records containing a database identifier of a search database, a first search condition, and a hit count representing an amount of entity identifiers found in a past search, the attribute value managed in association with the entity identifiers in the search database satisfying the first search condition;

determining, by the search device, anterior search databases identified with the database identifiers contained in the result records, the result records containing a hit count which is less than or equal to a predetermined amount or a hit count within a predetermined lowest ranks;

searching each of the anterior search databases by the search condition contained in the condition record containing the database identifier of the each of the anterior search databases to acquire a first search result including a first entity identifier, the attribute value managed in association with the first entity identifier in the each of the anterior search databases satisfying the search condition for the each of the anterior search databases;

determining common entity identifiers included in common in the first search results; and generating a new search condition by adding an entity identifier determined to be in common and searching each of posterior search databases to acquire a second search result including second entity identifiers, and where the posterior search database being out of the plural databases other than the anterior search databases, the attribute value managed in association with the second entity identifier in the each of the posterior search databases satisfies the search condition for the each of the posterior search database.

* * * * *

UNITED STATES PATENT AND TRADEMARK OFFICE
CERTIFICATE OF CORRECTION

PATENT NO. : 8,402,052 B2
APPLICATION NO. : 12/723232
DATED : March 19, 2013
INVENTOR(S) : Takeshi Sano et al.

Page 1 of 1

It is certified that error appears in the above-identified patent and that said Letters Patent is hereby corrected as shown below:

In the Claims:

Column 27, Line 61, In Claim 1, delete "results" and insert -- results; --, therefor.

Signed and Sealed this
Twenty-sixth Day of November, 2013

Margaret A. Focarino
*Commissioner for Patents of the United States Patent and Trademark Office*